United States Patent
Ananthakumar et al.

(10) Patent No.: US 11,593,694 B1
(45) Date of Patent: Feb. 28, 2023

(54) APPARATUS, METHOD, AND NON-TRANSITORY COMPUTER STORAGE MEDIUM FOR PERFORMING PREDICTIVE INFERENCES USING MULTIPLE PREDICTIVE MODELS

(71) Applicant: Groupon, Inc., Chicago, IL (US)

(72) Inventors: Ana Ananthakumar, Chicago, IL (US); Afsin Bulbul, Chicago, IL (US); Andrew Lisy, Chicago, IL (US); Situo Liu, Chicago, IL (US); Hechao Sun, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 315 days.

(21) Appl. No.: 16/869,439

(22) Filed: May 7, 2020

Related U.S. Application Data

(60) Provisional application No. 62/844,522, filed on May 7, 2019.

(51) Int. Cl.
*G06Q 30/00* (2012.01)
*G06N 7/00* (2023.01)
*G06Q 30/0601* (2023.01)
*G06N 20/00* (2019.01)

(52) U.S. Cl.
CPC ............ *G06N 7/005* (2013.01); *G06N 20/00* (2019.01); *G06Q 30/0631* (2013.01)

(58) Field of Classification Search
None
See application file for complete search history.

(56) References Cited

U.S. PATENT DOCUMENTS

| | | | | |
|---|---|---|---|---|
| 10,515,313 B2* | 12/2019 | Kaplow | ............. | G06N 5/043 |
| 2018/0189826 A1* | 7/2018 | Xu | ............. | G06Q 30/0254 |
| 2020/0311562 A1* | 10/2020 | Miller | ............. | G06N 5/02 |

OTHER PUBLICATIONS

Zhou, Lei, Multi-model predictive functional control fora nonlinear system, Aug. 1, 2011, Proceedings of 2011 International Conference on Electronic and Mechanical Engineering and Information Technology, vol. 3, pp. 1189-1192 (Year: 2011).*

\* cited by examiner

*Primary Examiner* — Jeffrey A. Smith
*Assistant Examiner* — Timothy J Kang
(74) *Attorney, Agent, or Firm* — Alston & Bird LLP

(57) ABSTRACT

Method, apparatus and computer program product for performing a cross-model predictive inference to generate a cross-model predictive output for a plurality of predictive inputs using a plurality of predictive models. For example, the apparatus includes at least one processor and at least one non-transitory memory including program code. The at least one non-transitory memory and the program code are configured to, with the at least one processor, obtain a model selection probability distribution which defines, for each predictive model, a respective selection probability score; obtain, for each predictive model, respective cross-model normalization data; for each predictive input, determine a cross-model predictive score; and determine, based on each determined cross-model predictive score, the cross-model predictive output.

22 Claims, 12 Drawing Sheets

APPARATUS, METHOD, AND NON-TRANSITORY COMPUTER STORAGE MEDIUM FOR PERFORMING PREDICTIVE INFERENCES USING MULTIPLE PREDICTIVE MODELS

CROSS-REFERENCE TO RELATED APPLICATIONS

The present application claims priority to U.S. Provisional Application Ser. No. 62/844,522, titled "PERFORMING PREDICTIVE INFERENCES USING MULTIPLE PREDICTIVE MODELS," filed May 7, 2019, the contents of which are incorporated herein by reference in their entirety.

BACKGROUND

Applicant has identified many deficiencies and problems associated with existing methods, apparatus, and systems related to performing predictive inferences using multiple (i.e., two or more) predictive models. Through applied effort, ingenuity, and innovation, many of these identified deficiencies and problems have been solved by developing solutions that are in accordance with embodiments of the present disclosure, many examples of which are described in detail herein.

BRIEF SUMMARY

In general, embodiments of the present disclosure provide methods, apparatus, systems, computing devices, and/or the like for performing predictive inferences using multiple (i.e., two or more) predictive models by using one or more of cross-model predictive inference, cross-model predictive score generation, cross-model score verification, and cross-model normalization.

In accordance with one aspect, an apparatus is provided. The apparatus comprises at least one processor and at least one non-transitory memory comprising program code. The at least one non-transitory memory and the program code are configured to obtain a model selection probability distribution, wherein the model selection probability distribution defines, for each predictive model of a plurality of predictive models, a respective selection probability score; obtain, for each predictive model of the plurality of predictive models, respective cross-model normalization data; determine a cross-model predictive score for each predictive input of the plurality of predictive inputs, wherein determining the cross-model predictive score for the predictive input comprises: determine, based on a weighted random selection for the predictive input, a respective selected predictive model of the plurality of predictive models, wherein at least one weighted random selection parameter is determined based on the model selection probability distribution; determine one or more model-specific predictive scores for the predictive input by applying the respective selected predictive model to the predictive input; and determine the cross-model predictive score for the predictive input by transforming the one or more model-specific predictive scores associated with the predictive input using the cross-model normalization data for the selected predictive model associated with the predictive input; determine, based on each cross-model predictive score for a predictive input of the plurality of predictive inputs, the cross-model predictive output for the plurality of predictive models; generate, based on the cross-model predictive output, an electronic communication for a promotional outreach related to a merchant of goods or services; and transmit the electronic communication to a computing device to facilitate rendering of data associated with the electronic communication via a graphical interface of the computing device.

In some embodiments, the at least one non-transitory memory and the program code are configured to identify, from the plurality of predictive models, a champion predictive model and one or more challenger predictive models. In some embodiments, the at least one non-transitory memory and the program code are configured to determine, for each predictive input of a plurality of predictive inputs, an initial ranking predictive score by applying the champion predictive model to the predictive input, wherein determining each cross-model predictive score for a predictive input of the plurality of predictive inputs comprises determining each cross-model predictive score in a predictive score generation order; and wherein the predictive score generation order is determined based on each initial ranking predictive score associated with a predictive input of the plurality of predictive inputs. In some embodiments, the champion predictive model has a respective selection probability score that is higher than the respective selection probability score for each challenger predictive model of the one or more challenger predictive models.

In some embodiments, the at least one non-transitory memory and the program code are configured to simultaneously generate a score for the champion predictive model and respective scores for the one or more challenger predictive models. Additionally, in some embodiments, the at least one non-transitory memory and the program code are configured to compare the respective scores for the one or more challenger predictive models to the score for the champion predictive model. In some embodiments, the at least one non-transitory memory and the program code are configured to evaluate the score for the champion predictive model and the respective scores for the one or more challenger predictive models based on two or more objective functions. In some embodiments, the at least one non-transitory memory and the program code are configured to select the champion predictive model or the one or more challenger predictive models based on an evaluation of the score for the champion predictive model and the respective scores for the one or more challenger predictive models.

In some embodiments, the at least one non-transitory memory and the program code are configured to identify the champion predictive model, and wherein identifying the champion predictive model comprises: identifying, for each predictive model of the plurality of predictive models, a retrospective predictive success score, wherein the retrospective predictive success score for each predictive model defines a retrospective prediction-outcome correspondence for the predictive model between one or more retrospective predictive scores generated by the predictive model and one or more retrospective ground-truth predictive outcomes corresponding to the one or more past predictive scores; and determining the champion predictive model based on each retrospective predictive success score associated with a predictive model of the plurality of predictive models. In some embodiments, the at least one non-transitory memory and the program code are configured to, for each predictive input of the plurality of predictive inputs: identify one or more unselected predictive models for the predictive input, wherein the one or more unselected predictive models for the predictive input comprise each predictive model in the plurality of predictive models other than the selected predictive model for the predictive input; determine, for each unselected predictive model of the one or more unselected predictive models, a verification predictive score by applying the unselected predictive model to the predictive input; obtain, subsequent to expiration of a threshold prospective performance time interval after determining the cross-model predictive output, a prospective ground-truth success outcome for the predictive input corresponding to the threshold prospective performance time interval; and determine a prospective predictive success score for each predictive model of the plurality of predictive models, wherein the prospective predictive success score for the selected predictive model is determined based on a recent ground-truth success outcome for the predictive input and the cross-model predictive score for the predictive input, and wherein each prospective predictive success score for an unselected predictive model of the one or more unselected predictive model is determined based on the recent ground-truth success outcome for the predictive input and the verification predictive score associated with the unselected predictive model.

In some embodiments, the at least one non-transitory memory and the program code are configured to adjust the selection probability score for each predictive model of the plurality of predictive models based on the prospective predictive success score for the predictive model. In some embodiments, each cross-model normalization data for a predictive model of the plurality of predictive models defines one or more cross-model conversion operations for the predictive model; the one or more cross-model conversion operations for a respective predictive model are configured to convert the cross-model predictive output for the respective predictive model each having an output-specific range to a cross-model value having a cross-model range; and each cross-model predictive score for a predictive model of the plurality of predictive models is determined based on a respective cross-model value for the predictive model. In some embodiments, determining the cross-model predictive output for the plurality of predictive models comprises: determining a predictive ranking of the plurality of predictive inputs based on each cross-model predictive score associated with a predictive input of the plurality of predictive inputs; determining the cross-model predictive output based on the predictive ranking of the plurality of predictive inputs; generating, based on the cross-model predictive output, an electronic communication for a promotional outreach related to a merchant of goods or services; and transmitting the electronic communication to a computing device to facilitate rendering of data associated with the electronic communication via a graphical interface of the computing device.

In some embodiments, each predictive input of the plurality of predictive inputs is associated with a candidate merchant identifier of a plurality of candidate merchant identifiers; each candidate merchant identifier of the plurality of candidate merchant identifiers is associated with a candidate merchant data structure of a plurality of candidate merchant data structures; each predictive input associated with a candidate merchant identifier comprises the candidate merchant data structure associated with the candidate merchant identifier; each cross-model predictive score for a predictive input of the plurality of predictive inputs indicates a merchant promotional outreach interest prediction for the candidate merchant identifier associated with the predictive input; and the cross-model predictive output indicates a threshold number of merchant identifiers of the plurality of candidate merchant identifiers whose corresponding merchant promotional outreach interest prediction exceeds is highest among each merchant promotional outreach interest prediction associated with a candidate merchant identifier of the plurality of candidate merchant identifiers. In some embodiments, determining the cross-model predictive output for the plurality of predictive models comprises: determining a predictive ranking of the plurality of predictive inputs based on each cross-model predictive score associated with a predictive input of the plurality of predictive inputs; determining the cross-model predictive output based on the predictive ranking of the plurality of predictive inputs; generating, based on the cross-model predictive output, an electronic communication for a promotional outreach related to a merchant of goods or services; and transmitting the electronic communication to a computing device to facilitate rendering of data associated with the electronic communication via a graphical interface of the computing device.

In some embodiments, each predictive input of the plurality of predictive inputs is associated with a candidate merchant identifier of a plurality of candidate merchant identifiers; each candidate merchant identifier of the plurality of candidate merchant identifiers is associated with a candidate merchant data structure of a plurality of candidate merchant data structures; each predictive input associated with a candidate merchant identifier comprises the candidate merchant data structure associated with the candidate merchant identifier; each cross-model predictive score for a predictive input of the plurality of predictive inputs indicates a merchant promotional outreach interest prediction for the candidate merchant identifier associated with the predictive input; and the cross-model predictive output indicates a threshold number of merchant identifiers of the plurality of candidate merchant identifiers whose corresponding merchant promotional outreach interest prediction exceeds is highest among each merchant promotional outreach interest prediction associated with a candidate merchant identifier of the plurality of candidate merchant identifiers. In some embodiments, determining the selected predictive model for a respective predictive input comprises: determining, based on the weighted random selection, a first randomly-selected predictive model for the predictive input.

In some embodiments, the at least one non-transitory memory and the program code are configured to identify the cross-model predictive score for the predictive input generated by the first randomly-selected predictive model; determine a first candidate cross-model predictive score by applying the first randomly-selected predictive model to the predictive input to generate one or more first candidate model-specific predictive scores and transforming the one or more first candidate model-specific predictive scores to the first candidate cross-model predictive score based on the cross-model normalization data for the first randomly-selected predictive model; determine whether the first candidate cross-model predictive score for the predictive input satisfies cross-model score adoption data for the plurality of predictive models; and in response to determining that the first candidate cross-model predictive score for the predictive input satisfies the cross-model score adoption data for the plurality of predictive models, adopt the first candidate cross-model predictive score as the cross-model predictive score for the predictive input.

In some embodiments, the at least one non-transitory memory and the program code are configured to, in response to determining that the first candidate cross-model predictive score for the predictive input fails to satisfy the cross-model score adoption data for the plurality of predictive models: identify a champion predictive model of the plurality of predictive models; determine a second candidate cross-model predictive score by applying the champion predictive model to the predictive input to generate one or more second candidate model-specific predictive scores and transforming the one or more second candidate model-specific predictive scores to the second candidate cross-model predictive score based on the cross-model normalization data for the champion predictive model; determine whether the second candidate cross-model predictive score for the predictive input satisfies cross-model score adoption data for the plurality of predictive models; and in response to determining that the second candidate cross-model predictive score for the predictive input satisfies the cross-model score adoption data for the plurality of predictive models, adopt the second candidate cross-model predictive score as the cross-model predictive score for the predictive input.

In some embodiments, the at least one non-transitory memory and the program code are configured to, in response to determining that the first candidate cross-model predictive score fails to satisfy the cross-model score adoption data for the plurality of predictive models: perform a second weighted random selection for the predictive input to determine a second randomly-selected predictive model of the plurality of predictive models; determine a second candidate cross-model predictive score by applying the second randomly-selected predictive model to the predictive input to generate one or more second candidate model-specific predictive scores and transforming the one or more second candidate model-specific predictive scores to the second candidate cross-model predictive score based on the cross-model normalization data for the second randomly-selected predictive model; determine whether the second candidate cross-model predictive score for the predictive input satisfies cross-model score adoption data for the plurality of predictive models; and in response to determining that the second candidate cross-model predictive score for the predictive input satisfies the cross-model score adoption data for the plurality of predictive models, adopt the second candidate cross-model predictive score as the cross-model predictive score for the predictive input.

In some embodiments, the at least one non-transitory memory and the program code are configured to, in response to determining that the first candidate cross-model predictive score for the predictive input fails to satisfy the cross-model score adoption data for the plurality of predictive models, modifying the plurality of predictive inputs to eliminate the predictive input. In some embodiments, the weighted random selection for a predictive input of the plurality of predictive inputs is characterized by one or more weighted random selection parameters for the predictive input.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1:
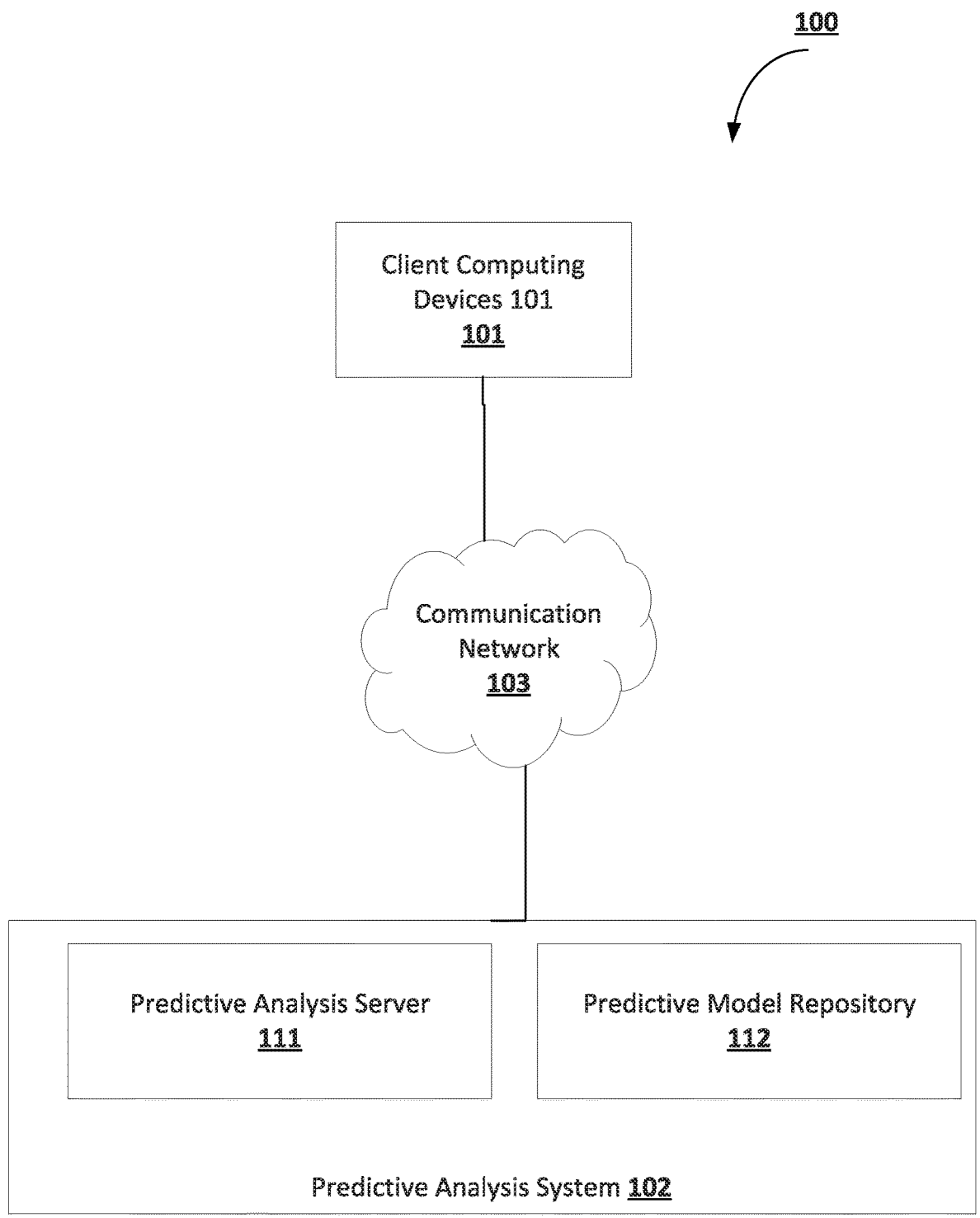

Having thus described some embodiments in general terms, references will now be made to the accompanying drawings, which are not necessarily drawn to scale, and wherein:

FIG. 1 is an example system architecture within which embodiments of the present disclosure may operate.

Figure 2:
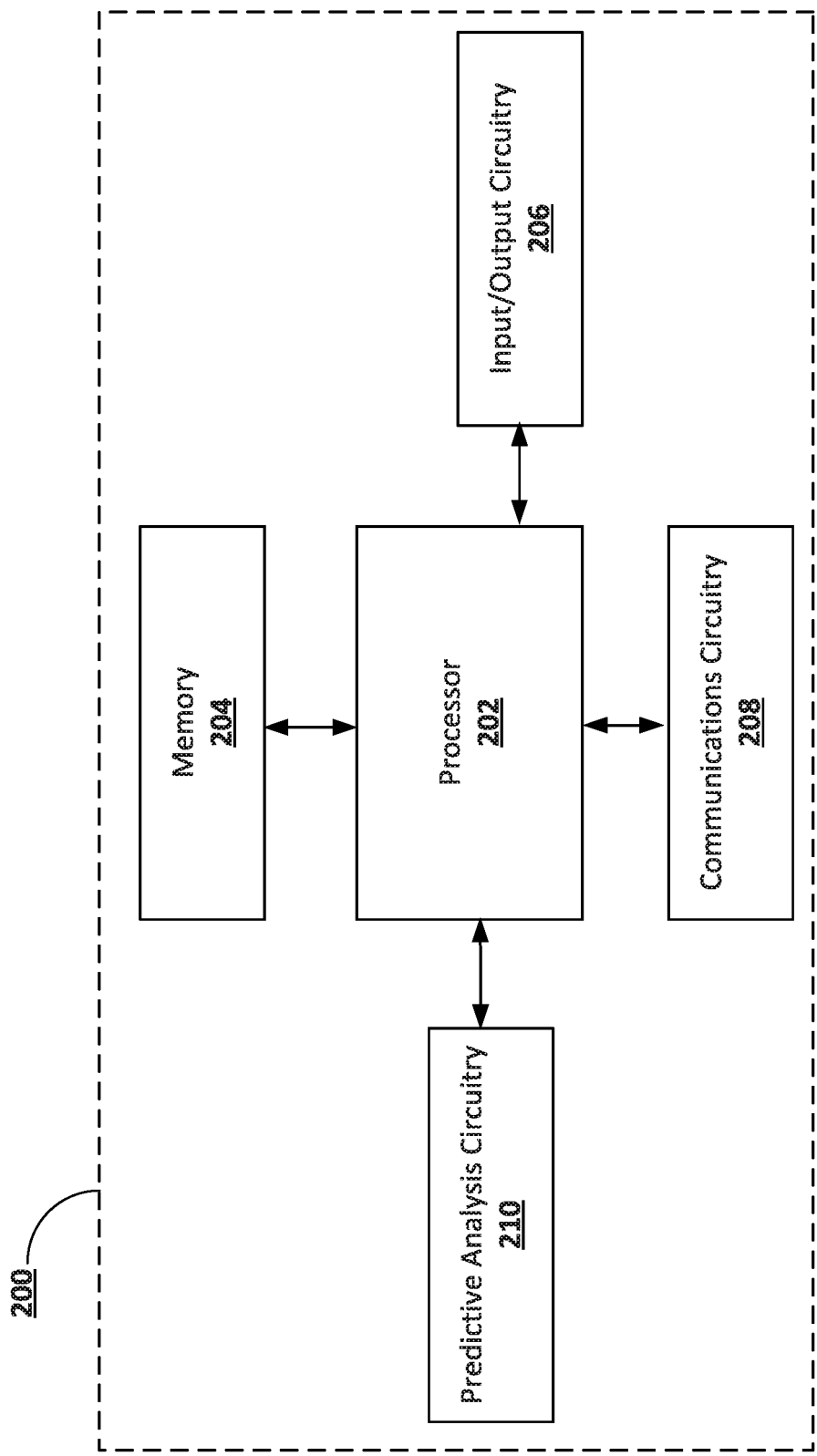

FIG. 2 is a schematic diagram of an example apparatus for a predictive analysis server in accordance with one embodiment of the present disclosure.

Figure 3:
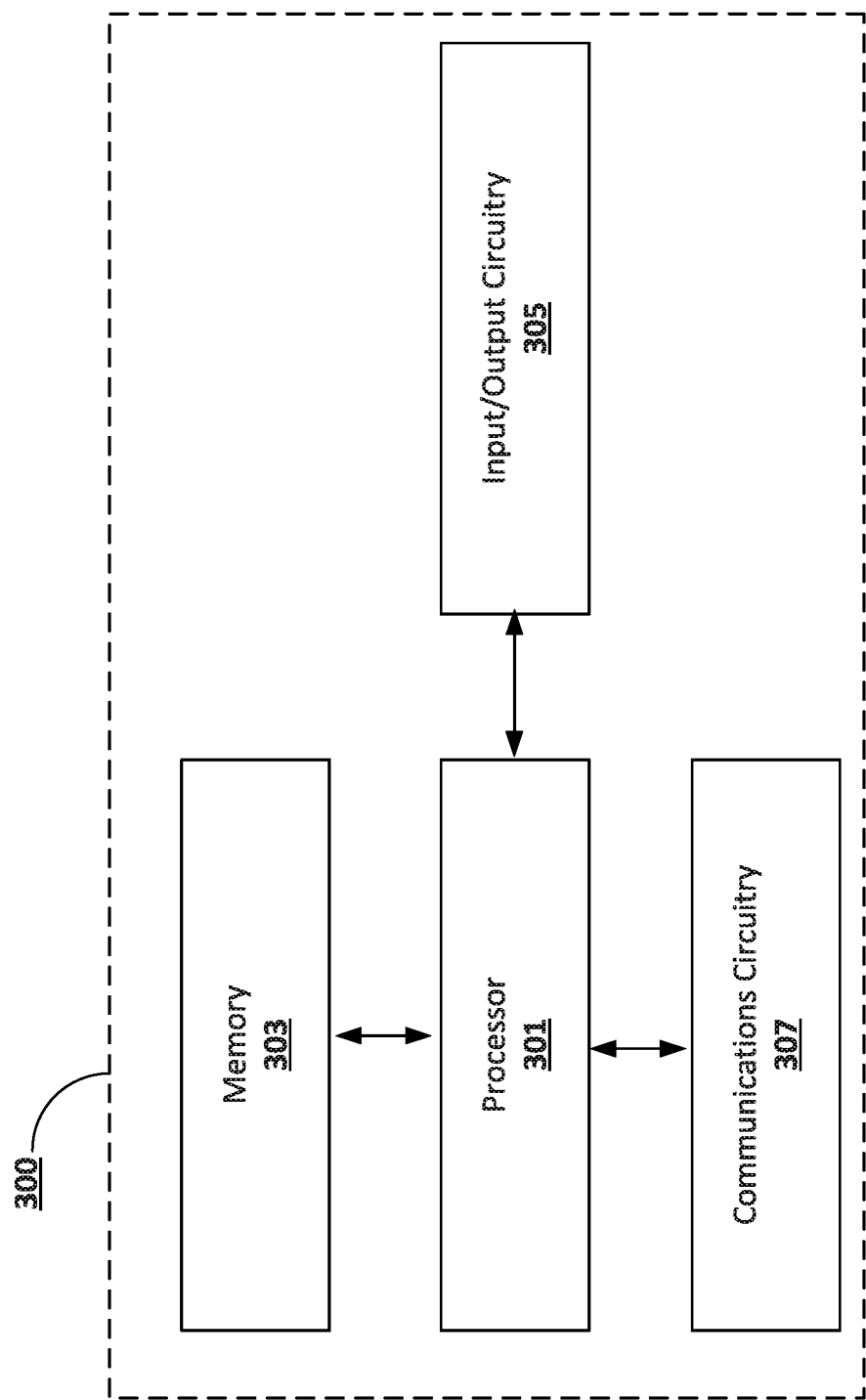

FIG. 3 is a schematic diagram of an example apparatus for a client computing device in accordance with one embodiment of the present disclosure.

Figure 4:
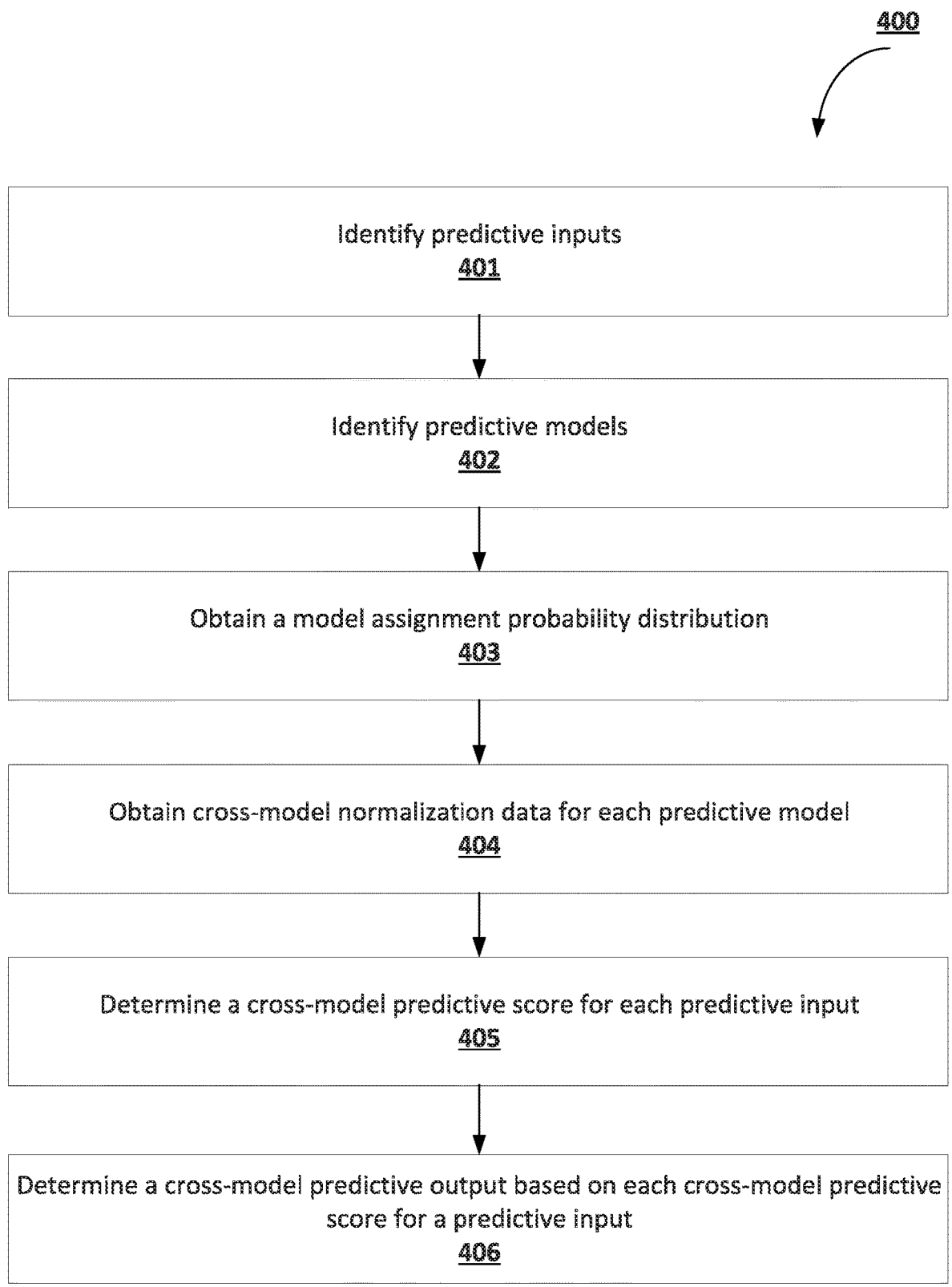

FIG. 4 is a flow diagram of a process for performing a cross-model predictive inference in accordance with one embodiment of the present disclosure.

Figure 5:
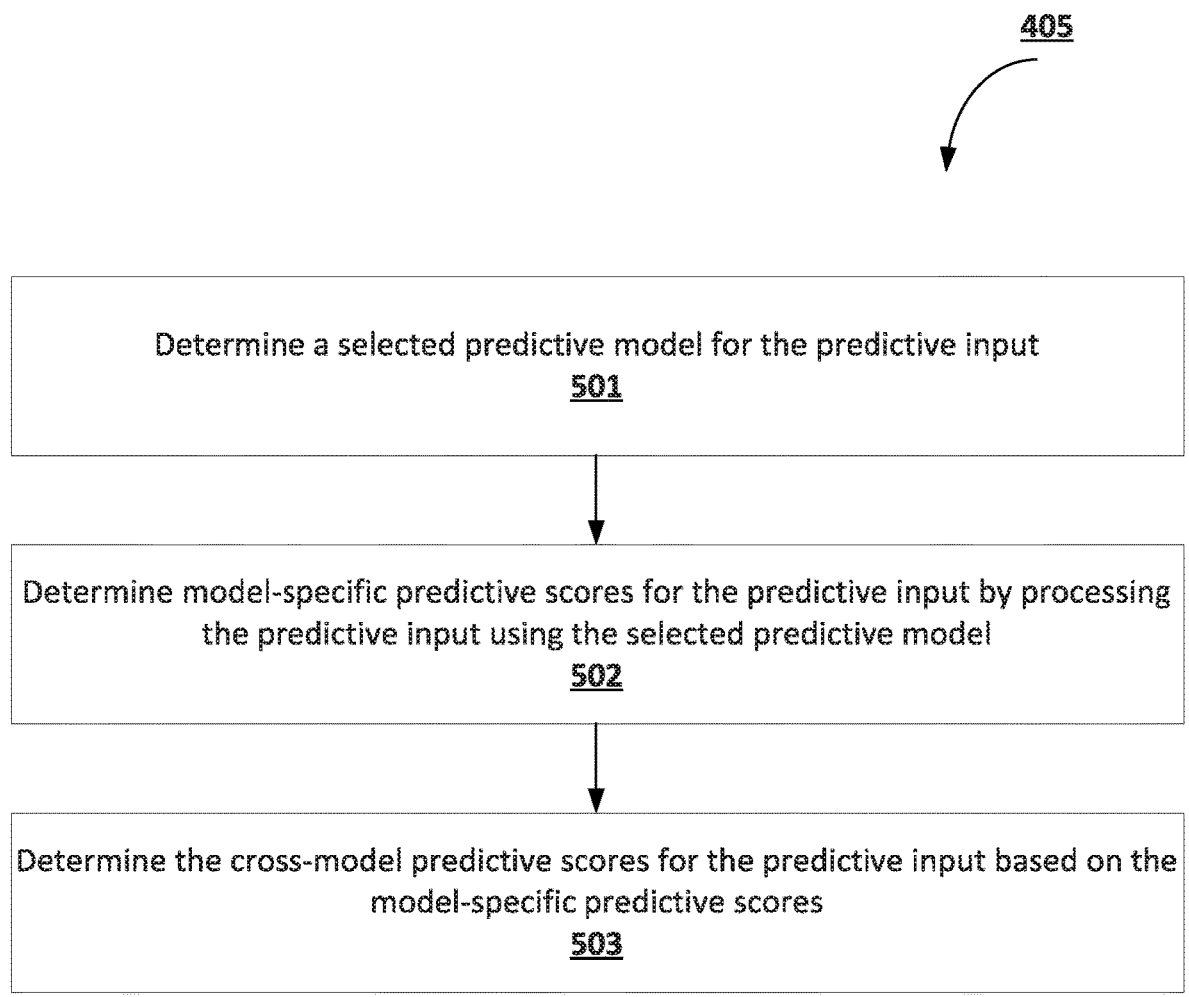

FIG. 5 is a flow diagram of a process for performing cross-model predictive score generation for a predictive input in accordance with one embodiment of the present disclosure.

Figure 6:
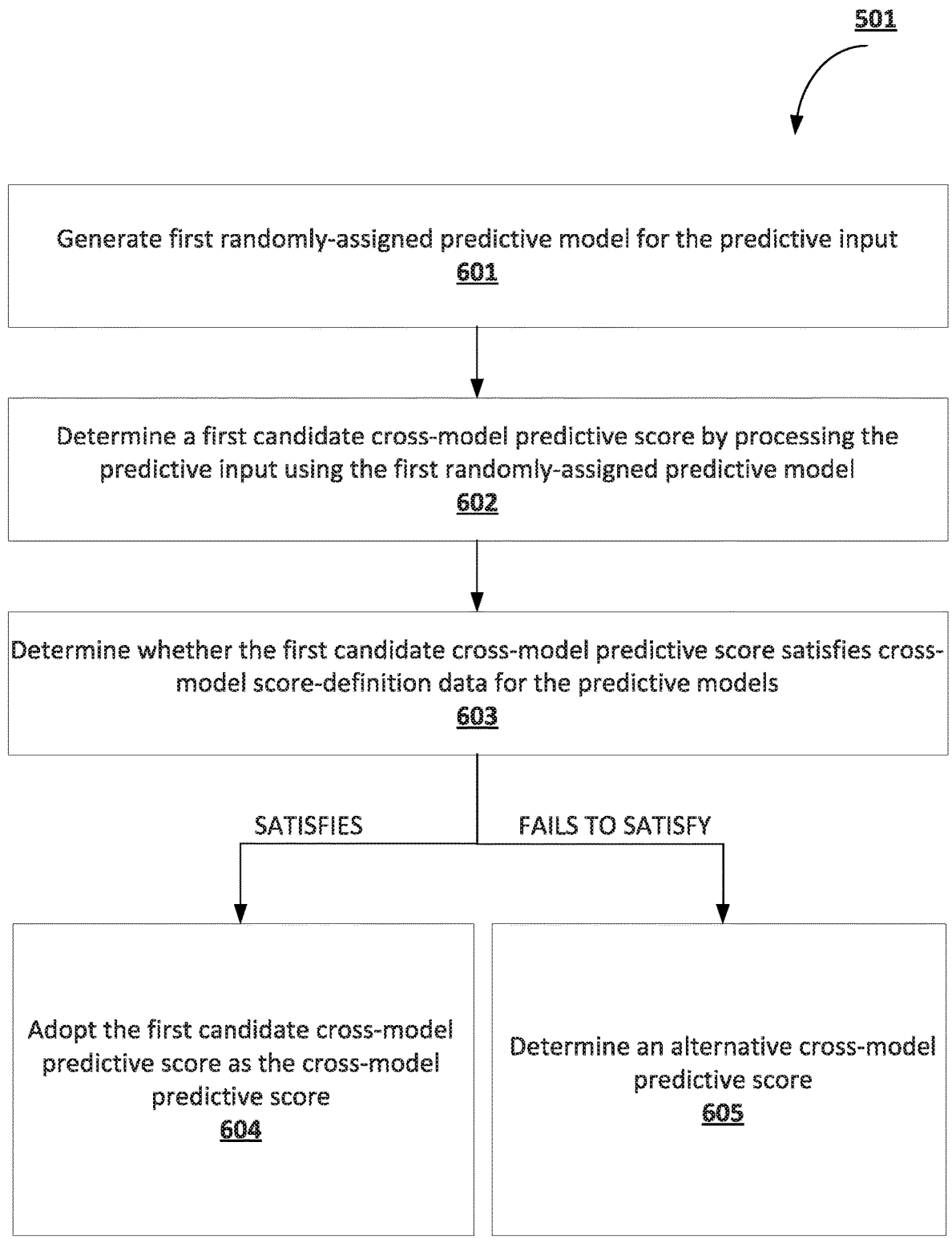

FIG. 6 is a flow diagram of a process for selecting a predictive model for a predictive input in accordance with one embodiment of the present disclosure.

Figure 7:
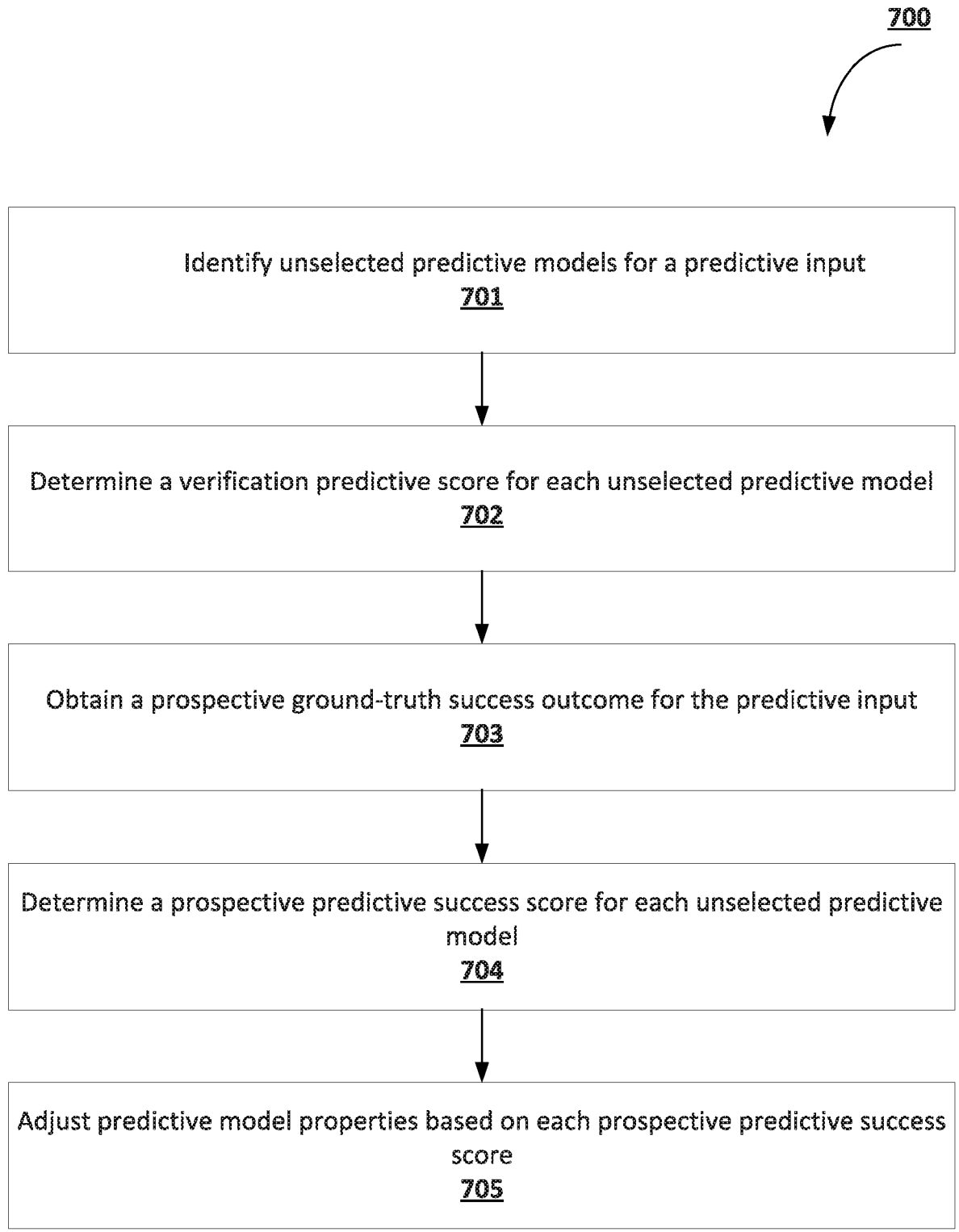

FIG. 7 is a flow diagram of a process for performing cross-model predictive verification for a predictive input in accordance with one embodiment of the present disclosure.

Figure 8:
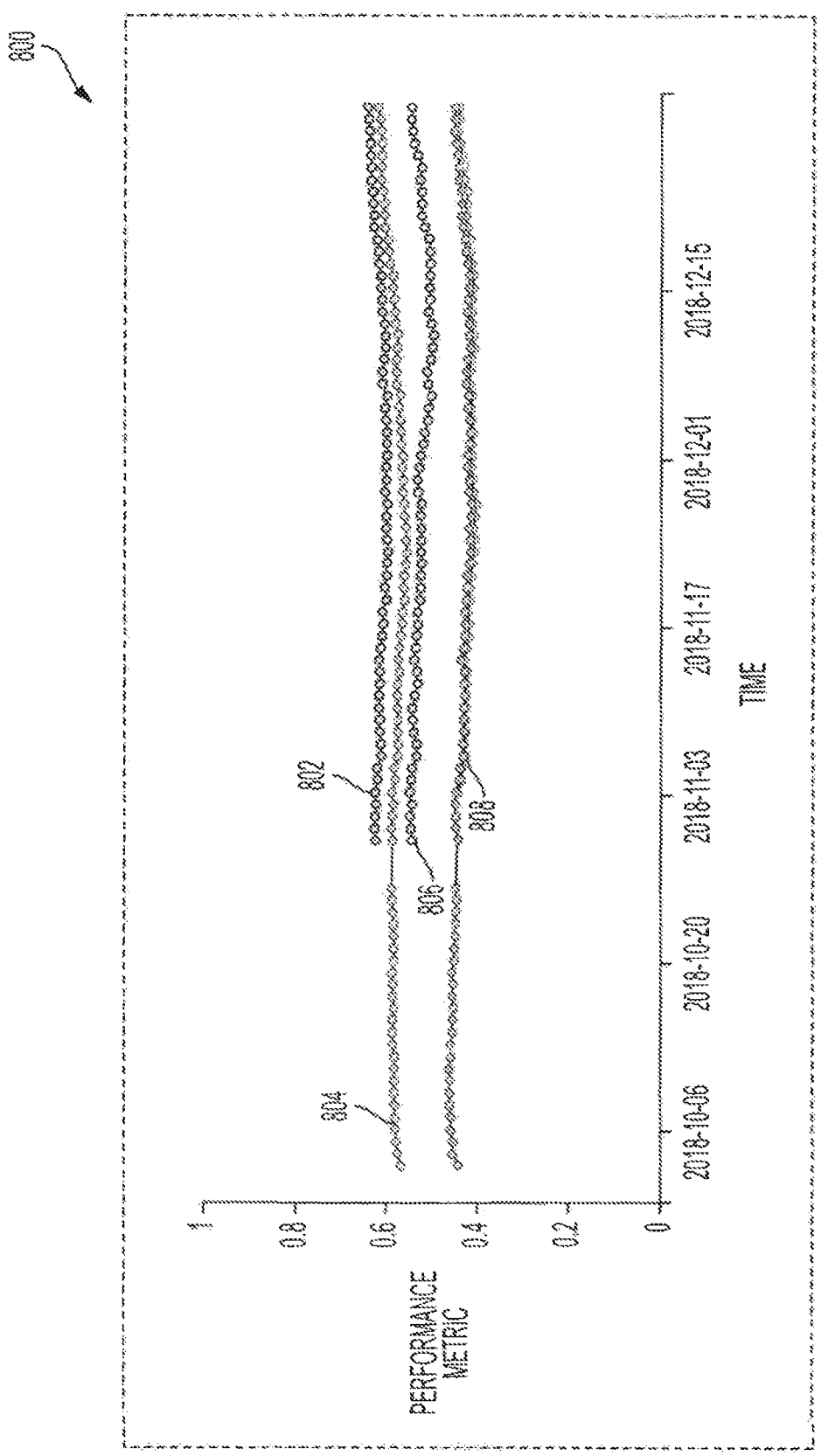

FIG. 8 is an exemplary electronic interface in accordance with one embodiment of the present disclosure.

Figure 9:
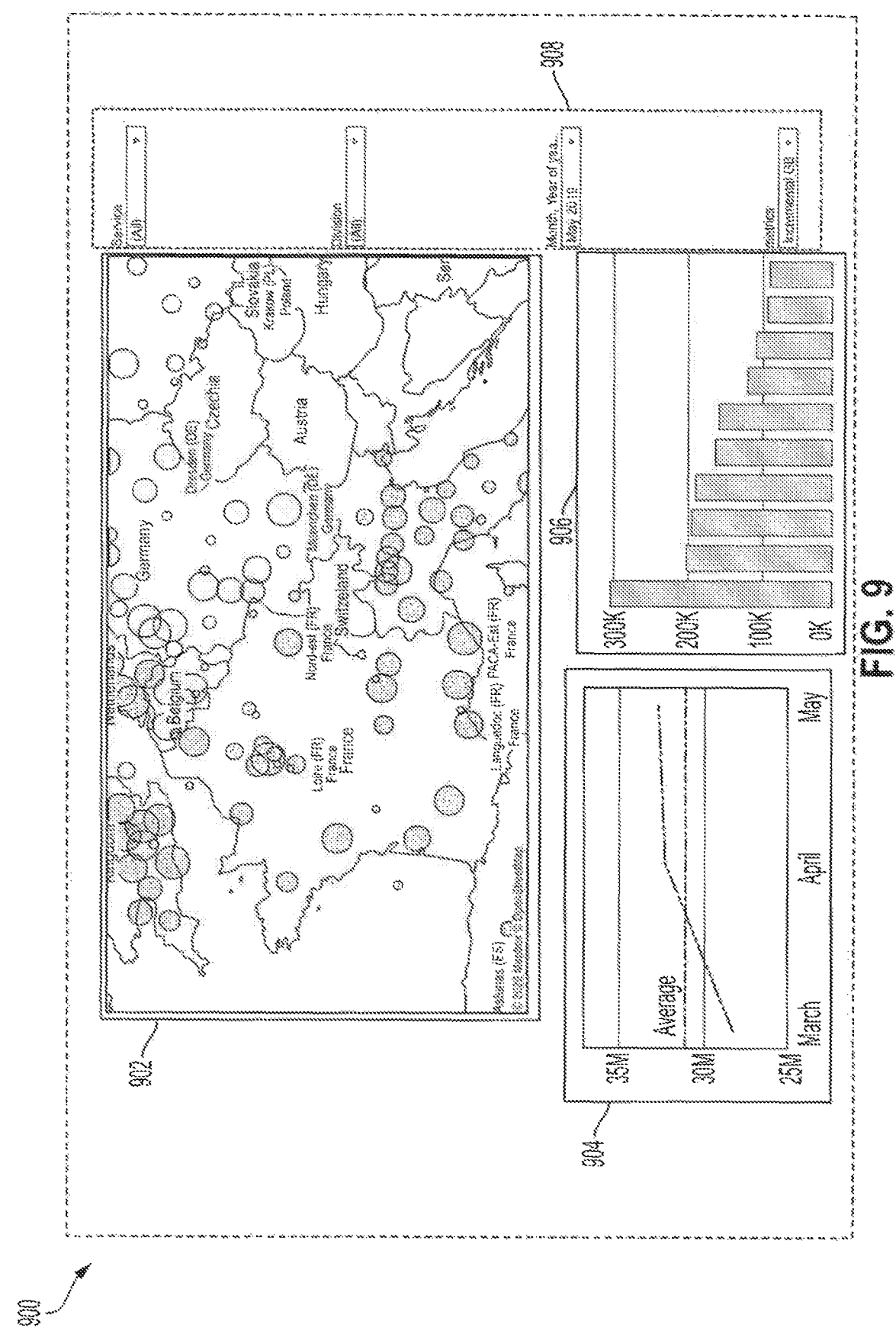

FIG. 9 is another exemplary electronic interface in accordance with one embodiment of the present disclosure.

Figure 10:
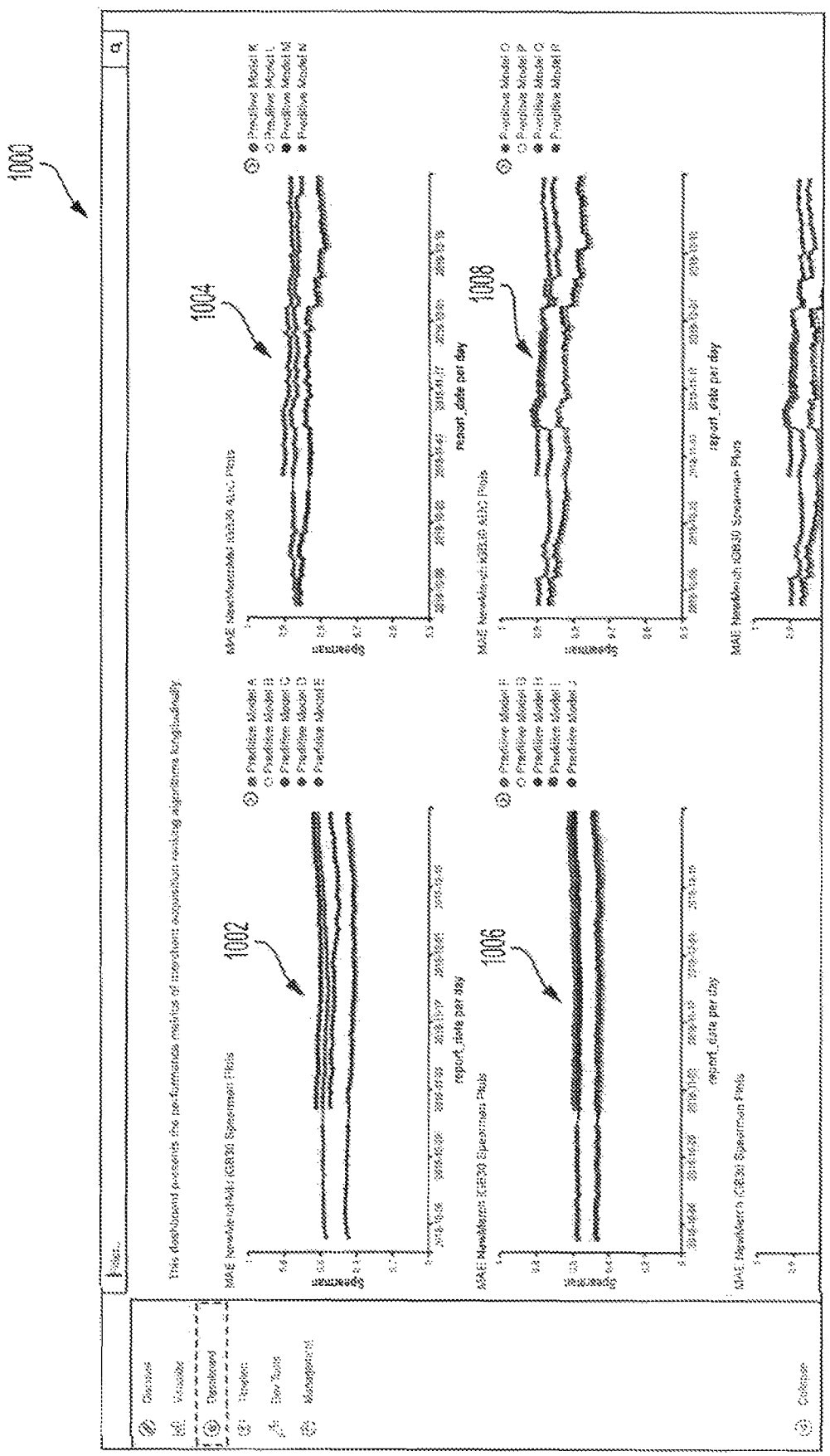

FIG. 10 is yet another exemplary electronic interface in accordance with one embodiment of the present disclosure.

Figure 11:
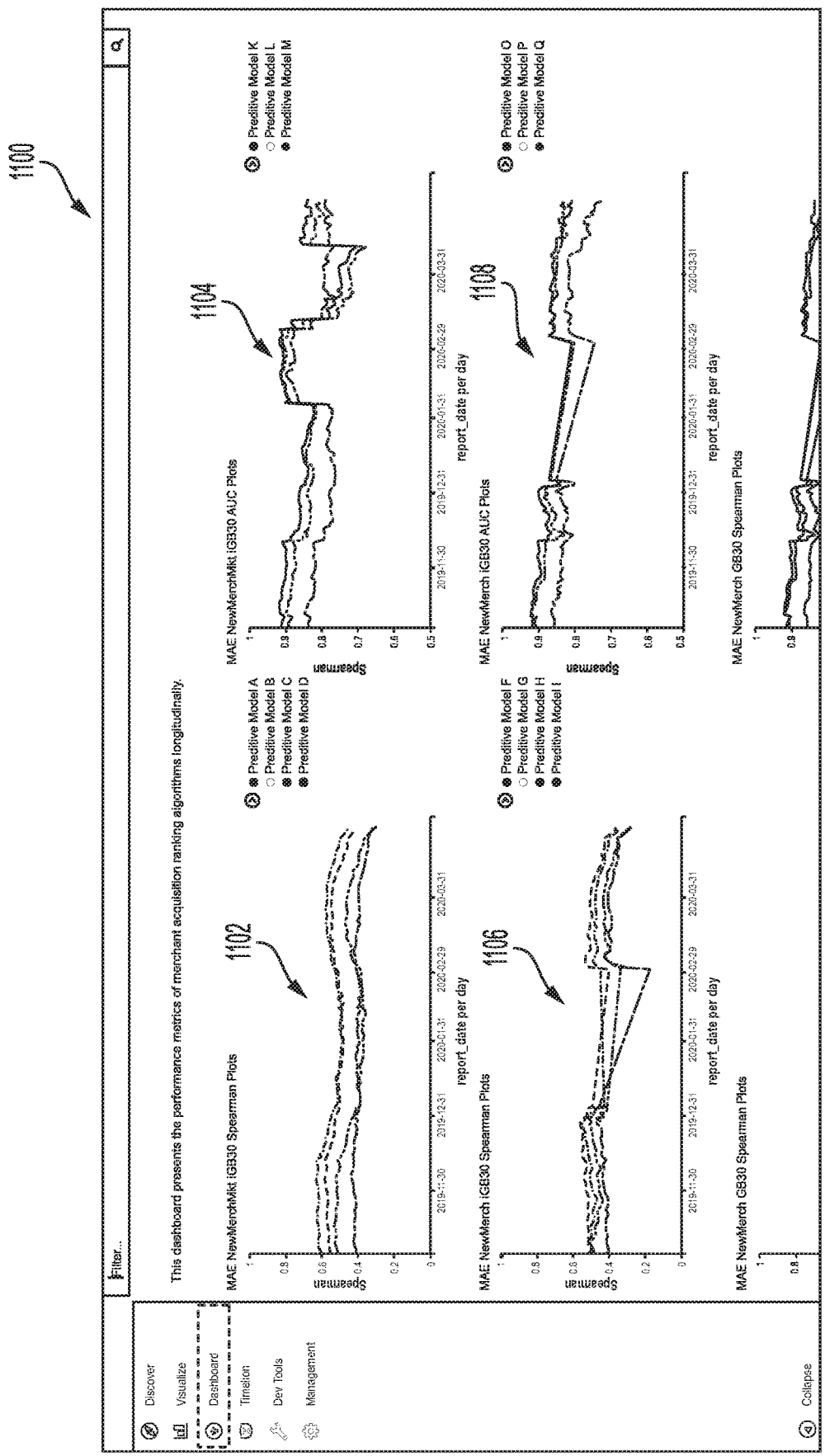

FIG. 11 is yet another exemplary electronic interface in accordance with one embodiment of the present disclosure.

Figure 12:
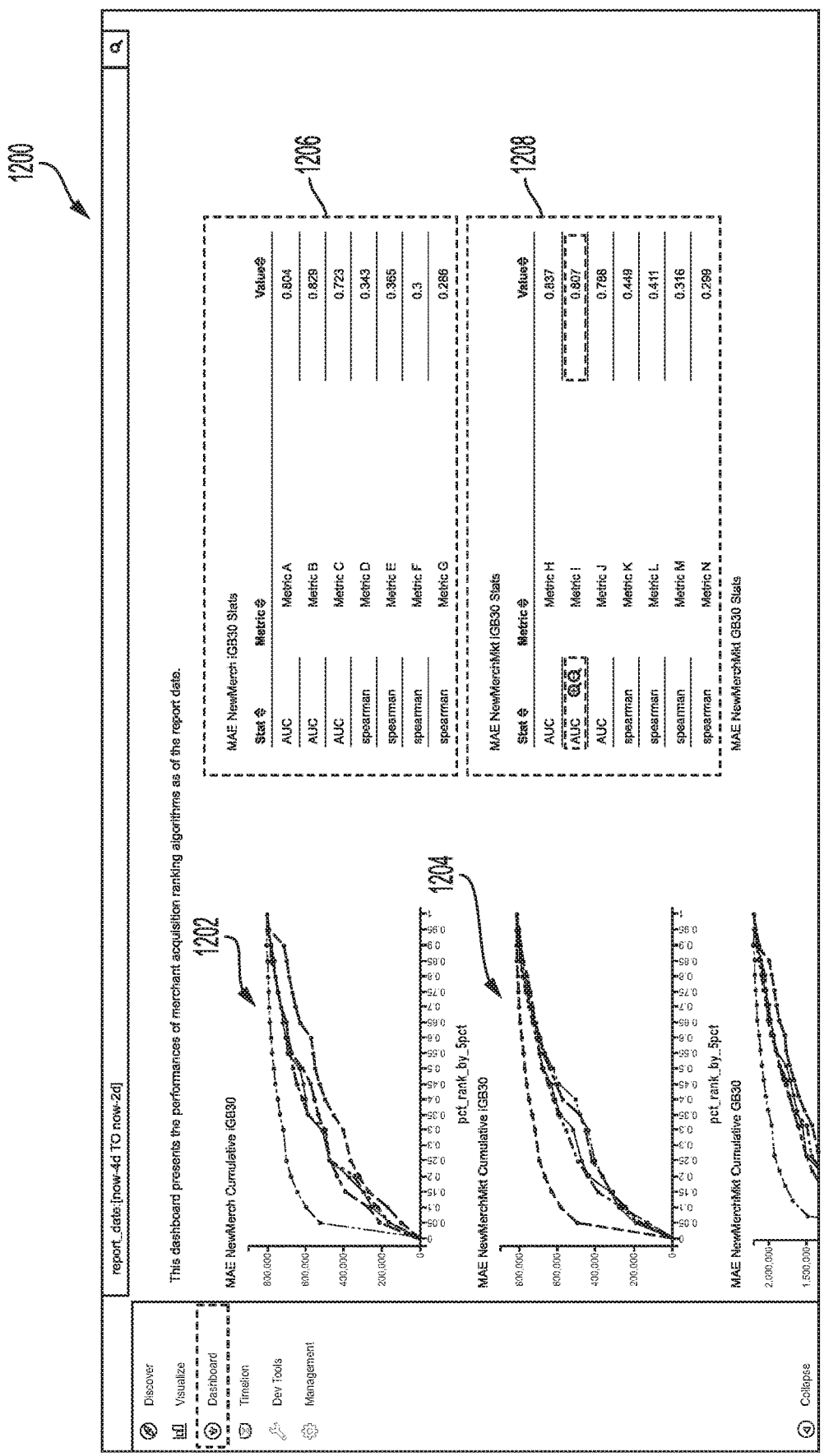

FIG. 12 is yet another exemplary electronic interface in accordance with one embodiment of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

Overview

Various embodiments of the present disclosure address technical challenges related to efficiency and reliability of predictive data analysis systems by enabling various techniques related to cross-model predictive inference. The field of predictive data analysis has had enormous recent successes which has led to the development of various predictive models (e.g., neural network models, Bayesian inference models, etc.). Each predictive model is typically configured to process predictive inputs of a particular format in accordance with a set of predictive parameters to generate a predictive output. Depending on their respective architectural complexities, operational requirements, and training complexities, different predictive models are utilized to process different predictive inferences. Thus, while a first predictive model may be suited to perform a first predictive inference having a first set of properties, the same first predictive model may be ill-suited to perform a second predictive inference having a second set of properties. On the other hand, a second predictive model may be better suited to perform the second predictive inference. For example, a predictive model that requires a high amount of training may be ill-suited for a predictive task that has limited training data and/or that should be performed with minimal operational load (e.g., a predictive task configured to be performed on a device with minimal processing and/or storage capacities). As another example, a predictive model that utilizes numeric transformations may be ill-suited for a predictive task that deals with a logically coherent real-world domain (e.g., the medical domain).

Using an ill-suited predictive model to perform a predictive task may lead to substantial efficiency and reliability drawbacks for predictive data analysis systems. For example, using predictive models that have excessive operational requirements may lead to significant efficiency drawbacks for predictive data analysis systems. As another example, using a predictive model that requires a high amount of training to perform a predictive task that should be performed with minimal operational load will both lead to efficiency drawbacks and make the overall for predictive data analysis systems unreliable due to high system failures and/or high response times. As a further example, using predictive models that require substantial training for predictive tasks not conducive to substantial training may undermine accuracy of such predictive models, and thus undermine the reliability of predictive data analysis systems utilizing such models.

Various embodiments of the present disclosure address the above-noted efficiency and reliability challenges for predictive data analysis systems stemming from predictive model diversity by introducing various techniques related to cross-model predictive inference that enable detecting optimal predictive models for individual predictive inputs and applying the detected optimal predictive models to the noted predictive inputs. Examples of the noted techniques include cross-model predictive inference, cross-model predictive score generation, cross-model score verification, and cross-model normalization. For example, by utilizing some aspects of cross-model predictive inference and some aspects of cross-model predictive score generation, various embodiments of the present disclosure enable selectively utilizing multiple predictive models to process multiple predictive inputs, thus enabling selection of the most optimal predictive model for each predictive input when performing cross-model predictive inferences. As another example, by utilizing some aspects of cross-model score verification, various embodiments of the present disclosure enable determining selection probabilities of individual predictive models based on empirical observations about correspondence of predictions generated by those models and real-world predictions, thus enabling improved detection of optimal predictive models for individual predictive inputs when performing cross-model predictive inferences. As yet another example, by utilizing some aspects of cross-model normalization, various embodiments of the present disclosure enable generating normalized outputs having a cross-model format based on model-specific outputs each having a model-specific format, thus enabling better integration and interoperability between various predictive models when performing cross-model predictive inferences.

Various embodiments of the present disclosure relate to cross-model verification and/or cross-model normalization of various predictive models in multi-model predictive systems. For example, given three models each predicting a ranking of the same set of data, it may be impractical and/or impossible to test all the three predictive models, at least in part because of the overlap in how those models perform the ranking prediction. As another example, given 100 predictive inputs corresponding to 100 marketing leads for merchants of goods or services, and further given three predictive models, it may be impractical and/or impossible to provide the marketing leads to three different marketing agents determined by the three predictive models. This may be because, as soon a first predicted team acts with respect to a particular input lead, that lead may be unavailable for further action by other predicted teams. As a result, there is a technical need for cross-model verification and normalization across various predictive models. Various embodiments of the present disclosure address this technical need by enabling techniques for one or more of cross-model predictive inference, cross-model predictive score generation, cross-model score verification, and cross-model normalization. In doing so, the noted embodiments improve accuracy and reliability of predictive models in multi-model predictive system, as well as efficiency of model verification and normalization in such systems.

Additionally, various embodiments of the present disclosure provide a predictive analysis system for selectively utilizing multiple predictive models to process multiple predictive inputs related to electronic communications regarding outreach to merchants of goods or services. For example, in order to effectively determine whether to generate and transmit an electronic communication regarding outreach for a particular market of goods or services and/or particular merchants of goods or services, efficient testing and/or validation of predictive models for marketing leads related to a given market and/or merchants of goods or services are provided. The testing and/or validation of the predictive models can include cross-model verification and/or cross-model normalization of the predictive models.

In certain embodiments, a predictive model can employ a mapping of merchant identifiers with respect to different markets for goods or services to facilitate a ranking of candidate merchants for particular goods or services. In an embodiment, a predictive model is a retrained version and/or a modified version of one or more previous predictive models. In another embodiment, one or more predictive models solve for a different use case for goods or services as compared to one or more other predictive models.

In certain embodiments, an optimal ranking model of candidate merchants for a particular good or service can be determined. In another embodiment, a predictive model with a highest score can be employed to determine one or more merchants for a merchant promotional outreach. In certain embodiments, an electronic communication for a merchant promotional outreach can be generated and/or transmitted to a consumer device to facilitate rendering of data for the merchant promotional outreach via an electronic interface of the consumer device.

Accordingly, a number of computing resources employed by a predictive analysis system for transmitting electronic communications to one or more consumer devices can be reduced. Additionally or alternatively, for a predictive analysis system that provides predictive analysis via predictive models and/or manages a predictive model repository to facilitate predictive analysis via predictive models, a number of memory resources related to candidate merchants and/or goods or services for a merchant promotional outreach can be reduced.

Various embodiments additionally or alternatively improve performance of a processor configured to execute one or more operations associated with cross-model predictive inference, cross-model predictive score generation, cross-model score verification, and/or cross-model normalization. For example, various embodiments improve processing speed and/or reduce a number of computational resources associated with cross-model predictive inference, cross-model predictive score generation, cross-model score verification, and/or cross-model normalization. Furthermore, various embodiments additionally or alternatively improve training of a machine learning network (e.g., a neural network) associated with cross-model predictive inference, cross-model predictive score generation, cross-model score verification, and/or cross-model normalization. For example, various embodiments additionally or alternatively provide improved or reduced parameters, improved values, improved weights, and/or improved thresholds for a machine learning network (e.g., a neural network) associated with cross-model predictive inference, cross-model predictive score generation, cross-model score verification, and/or cross-model normalization.

Various embodiments of the present disclosure relate to gradual testing and/or roll-out of new predictive models. For example, given model A (e.g., an incumbent predictive model) and model Y (e.g., a challenger predictive model), various embodiments of the present disclosure disclose gradually testing Y over time and, given the test results, allocating a proportional portion of predictive tasks to model Y. In enabling gradual testing and/or roll-out of new predictive models, various embodiments of the present disclosure increase efficiency and/or accuracy associated with model roll-out, while enhancing the overall efficiency and reliability of a multi-model predictive system.

Various embodiments additionally or alternatively improve performance of a processor configured to execute one or more operations associated with gradual testing and/or roll-out of new predictive models. For example, various embodiments improve processing speed and/or reduce a number of computational resources associated with gradual testing and/or roll-out of new predictive models. Furthermore, various embodiments additionally or alternatively improve training of a machine learning network (e.g., a neural network) associated with gradual testing and/or roll-out of new predictive models. For example, various embodiments additionally or alternatively provide improved or reduced required parameters, improved values, improved weights, and/or improved thresholds for a machine learning network (e.g., a neural network) associated with gradual testing and/or roll-out of new predictive models. As such, various embodiments disclosed herein provide a technical improvement associated with machine learning.

Various embodiments additionally or alternatively improve efficiency of processing of predictive models. For instance, various embodiments additionally or alternatively provide for testing and/or evaluating two or more predictive models in parallel to provide more efficient processing and/or a reduced number of computational resources for testing predictive models. In an example embodiment, three predictive models can be tested in parallel and the three predictive models can be evaluated based on two or more objective functions. For example, the three predictive models can be evaluated based on a first objective function (e.g., a purchase frequency for food and drink), a second objective function (e.g., incremental revenue at a particular geographical location), and a third objective function (e.g., revenue for a geographical division).

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "obtain" may refer to electronic retrieval (e.g., from local or remote memory or other storage such as a repository, and the like). The term "obtain" may refer to electronic receipt (e.g., receiving via a local communication bus, receiving from a remote computing device or repository via a communication network, and the like).

The term "user" should be understood to refer to an individual, group of individuals, business, organization, and the like. The users referred to herein may access a predictive analysis server using client computing devices (as defined herein).

The term "client computing device" refers to computer hardware and/or software that is configured to access a service made available by a server. The server is often (but not always) on another computer system, in which case the client computing device accesses the service by way of a network. Client computing devices may include, without limitation, smart phones, tablet computers, laptop computers, wearables, personal computers, enterprise computers, and the like.

The term "cross-model predictive inference" refers to a computer-implemented process for determining a prediction based on a predictive input using a predictive framework that utilizes two or more predictive models. For example, a cross-model predictive inference could include selecting a particular predictive model of two or more predictive models to apply to a particular predictive input and applying the particular predictive model to the particular predictive input to determine a particular prediction for the particular predictive input. As another example, a cross-model predictive inference could include applying n predictive models of multiple predictive models to a particular predictive input in order to determine a particular predictive output based on the particular predictive input, where n=>2.

The term "cross-model predictive output" refers to a collection of one or more data items that indicate a prediction determined using a cross-model predictive inference based on a predictive input. For example, a cross-model predictive inference could include applying a selected predictive model of two or more predictive models to a predictive input in order to generate a corresponding cross-model predictive output. As another example, a cross-model predictive inference could include applying n predictive models of multiple predictive models on a particular predictive input in order to determine a cross-model predictive output for the predictive input, where n=>2. The term "predictive input" refers to a collection of one or more data items that indicate an input to a predictive process, e.g., an input to a cross-model predictive inference. For example, a particular predictive input may include information about a particular merchant identifier, where the particular predictive input is configured to be supplied as an input to a particular predictive process, and wherein the particular predictive process is configured to generate a merchant promotional outreach interest prediction for the particular merchant identifier. As another example, a particular predictive input may include information about a particular patient, where the particular predictive input is configured to be supplied as an input to a particular predictive process, and wherein the particular predictive process is configured to generate a predictive health score for the particular patient. As yet another example, a particular predictive input may include information about a particular consumer, where the particular predictive input is configured to be supplied as an input to a particular predictive process, and wherein the particular predictive process is configured to generate a promotion interest score for the particular consumer.

The term "predictive model" refers to a collection of one or more data items that indicate one or more predictive operations configured to be performed on a predictive input in order to determine a model-specific predictive score. Examples of predictive models include regression models, Bayesian inference models, neural network models, machine learning models, etc. Examples of data items characterizing a particular predictive model include data items associated with parameters of the predictive model, data items indicating a meta-structure (e.g., number of layers) of the particular predictive model, data indicating particular operations (e.g., particular non-linear operations) associated with the particular predictive model, etc.

The term "selection of a predictive model" for a predictive input refers to programmatic selection of a predictive model as the predictive model used for the predictive input. For example, selection of a predictive model for a predictive input may include determining a model-specific predictive score for the predictive input based on the predictive model, where the model-specific predictive score is used to determine a cross-model predictive score for the predictive input.

The term "model selection probability distribution" refers to a collection of one or more data items that indicate, for each predictive model among two or more predictive models, a selection probability score. For example, a particular model selection probability distribution for a group of three predictive models may indicate the following selection probability scores for the three predictive models: 50% selection probability score for a first predictive model of the three predictive models, 40% selection probability score for a second predictive model of the three predictive models, and 10% selection probability score for a third predictive model of the three predictive models.

The term "selection probability score" refers to a collection of one or more data items that indicate, for a corresponding predictive model of two or more predictive models, a preferred ratio for selection of the corresponding predictive model when the two or more predictive models are applied to a group of predictive inputs in order to determine a group of corresponding cross-model predictive outputs. For example, if a particular predictive model of two or more predictive models has a 40% selection probability score, the noted selection probability score may indicate a preference that a cross-model predictive inference configured to apply the two or more predictive inputs for a group of predictive inputs selects the particular predictive models 40% of the times (e.g., apply the particular predictive model to 40% of the group of predictive inputs).

The term "cross-model normalization" refers to a computer-implemented process for determining a cross-model predictive score based on a model-specific predictive score determined by a corresponding predictive model. For example, if a particular predictive model of two or more predictive models is configured to determine one model-specific predictive score that is selected from the model-specific range {A, B, C, D, E, F} organized in a descending order of value, and further if a cross-model predictive inference associated with the two or more predictive models is configured to determine cross-model predictive outputs based on cross-model predictive scores selected from the cross-model range {0%-100%), performing a cross-model normalization associated with the particular predictive model may include operations configured to convert a model-specific predictive output indicating "A" to a cross-model predictive score indicating 100%, a model-specific predictive output indicating "B" to a cross-model predictive score indicating 80%, a model-specific predictive output indicating "C" to a cross-model predictive score indicating 60%, a model-specific predictive output indicating "D" to a cross-model predictive score indicating 40%, a model-specific predictive output indicating "E" to a cross-model predictive score indicating 20%, and a model-specific predictive output indicating "F" to a cross-model predictive score indicating 0%. As another example, if a particular predictive model of two or more predictive models is configured to determine two model-specific predictive outputs but a cross-model predictive inference associated with the two or more predictive models is configured to determine a cross-model predictive output based on a single cross-model predictive scores, performing a cross-model normalization associated with the particular predictive model may include operations configured to combine (e.g., average) the two model-specific predictive outputs to determine the single cross-model predictive output.

The term "cross-model normalization data" refers to a collection of one or more data items that describe operations and/or parameters used to perform cross-model normalization for a particular predictive model. In some embodiments, cross-model normalization data for a particular predictive model may indicate that the cross-model predictive score for each model-specific predictive score is determined based on an ascending or descending order of the model-specific predictive scores. For example, given the cross-model predictive scores 500, 200, 100, 50, and 5 for predictive inputs A-E respectively, the cross-model normalization data may indicate that the cross-model predictive for predictive input C (i.e., with the model-specific predictive score 100) should be $60^{th}$ percentile since the model-specific predictive score for the predictive input C is the third highest model-specific predictive score among the model-specific predictive scores for the predictive inputs A-E.

The term "cross-model predictive score generation" refers to a computer-implemented process for performing a cross-model predictive inference on a particular predictive input. For example, performing a cross-model predictive score generation may include performing operations configured to generate a cross-model predictive score for a predictive input based on one or more model-specific predictive scores for the predictive input determined by a selected predictive input associated with the predictive model.

The term "weighted random selection" refers to a collection of one or more data items that indicate operations for selecting a particular predictive model of two or more predictive models to apply to a predictive input of two or more predictive inputs, where the selection is performed based on a random process defined by one or more random selection parameters. The weighted random selection is deemed "weighted" because the random selection process is performed based on weights defined by the one or more random selection parameters. For example, a weighted random selection may define operations for selecting a particular predictive model of two or more predictive models based on a random selection, where the random selection is defined by random selection parameters that are in turn defined by each selection probability score for a predictive model as defined by the model selection probability distribution for the two or more predictive models.

The term "random selection parameter" refers to a collection of one or more data items that indicate at least one aspect of a probability distribution utilized to perform a weighted random selection. In some embodiments, at least one random selection parameter may be defined by at least one selection probability score for a predictive model. In some embodiments, at least one random selection parameter may be defined by at least one property of at least one predictive input. In some embodiments, at least one random selection parameter may be defined by a random number generation process.

The term "selected predictive model" refers to a predictive model selected to be applied to a particular predictive input as part of cross-model predictive score generation for the particular predictive input. For example, the selected predictive model for a particular predictive input may be defined based on one or more of at least one weighted selection random parameter for the particular predictive input and at least one selection probability score.

The term "unselected predictive model" refers to any predictive model not selected to be applied to a particular predictive input as part of cross-model predictive score generation for the particular predictive input. For example, if a cross-model predictive inference is associated with two predictive models A and B and the predictive model B is selected for application to a particular predictive input, then the predictive B is an unselected predictive model for the particular predictive input.

The term "model-specific predictive score" refers to a collection of one or more data items determined by a corresponding predictive model via applying the corresponding predictive model to a particular predictive input. For example, a particular predictive model may be configured to process particular input properties for a particular merchant identifier to determine an alphabetical merchant promotional outreach interest prediction, where the alphabetical merchant promotional outreach interest prediction is a model-specific predictive score.

The term "cross-model predictive score" refers to a collection of one or more data items determined by performing cross-model normalization on one or more corresponding model-specific predictive scores. For example, performing a particular cross-model normalization for a particular predictive model may include transforming alphabetical merchant promotional outreach interest predictions generated by the particular predictive model into numeric merchant promotional outreach interest predictions, where the alphabetical merchant promotional outreach interest predictions are a model-specific predictive scores and the numeric merchant promotional outreach interest predictions are cross-model predictive scores. As another example, performing cross-model normalization for a particular predictive model may include combining two model-specific predictive scores determined by the particular predictive model to determine a single cross-model predictive score for the particular predictive model.

The term "champion predictive model" refers to a predictive model associated with a cross-model predictive inference that is designated to be a superior, a preferred, and/or a primary predictive model for the cross-model predictive inference. For example, a cross-model predictive inference associated with two or more predictive models may include a neural network predictive model of the two or more predictive models that is designated as the champion predictive model. In some embodiments, a champion predictive model is a predictive model having one or more of the following properties: a higher correlation coefficient than the correlation coefficient of the challenger predictive model, a higher Spearman correlation coefficient than the Spearman correlation coefficient of the challenger predictive model, a lower root-mean-square error (RMSE) than the RMSE of the challenger predictive model, and a lower P-value than the P-value of the challenger predictive model. In some embodiments, at least one of the correlation coefficient of a predictive model, a Spearman coefficient of a predictive model, and a RMSE of a predictive model may be determined based on the predicted performance of a group of cross-model predictive outputs and the actual performance of the group of cross-model predictive outputs.

The term "challenger predictive model" refers to any predictive model associated with a cross-model predictive inference that is not designated as a champion predictive model. For example, a cross-model predictive inference associated with three predictive models including a neural network predictive model, a regression predictive model, and a Bayesian inference predictive model may designate the neural network predictive model as the champion predictive model, and the regression predictive model and the Bayesian inference predictive model as the challenger predictive models.

The term "initial ranking predictive score" refers to a collection of one or more data items that indicate, for each predictive input of two or more predictive inputs, a score configured to indicate a position of the predictive input in a predictive score generation order for the two or more predictive inputs. For example, the initial ranking predictive score for a particular predictive input may indicate that the predictive input of two or more predictive input should be the nth predictive input in a predictive score generation order for the two or more predictive inputs.

The term "predictive score generation order" refers to a collection of one or more data items that indicate, for a cross-model predictive inference of two or more predictive inputs, an order of performing cross-model score generations for each of the two or more predictive inputs. For example, a particular predictive score generation order for a cross-model predictive inference associated with the predictive inputs {A, B, C, D} may indicate that the cross-model generation for predictive input B must performed first, the cross-model generation for predictive input A must performed second, the cross-model generation for predictive input D must performed third, and the cross-model generation for predictive input C must performed fourth. The predictive score generation order may be based on a random ordering of predictive inputs.

The term "retrospective predictive success score" refers to a collection of one or more data items that indicate, for a corresponding predictive model, a corresponding prediction-outcome correspondence for the predictive model between one or more retrospective predictive scores generated by the predictive model and one or more retrospective ground-truth predictive outcomes corresponding to the one or more retrospective past predictive score. For example, the retrospective predictive success score for a particular predictive model may indicate that the particular predictive model has accurately target prediction properties for 50% of past predictive inputs.

The term "retrospective prediction-outcome correspondence" refers to a collection of one or more data items that indicate, for a corresponding predictive model, a level of correspondence between one or more retrospective predictive scores generated by the corresponding predictive model and one or more retrospective ground-truth predictive outcomes corresponding to the one or more retrospective predictive scores. For example, a retrospective prediction-outcome correspondence for a predictive model may indicate that 50% of retrospective predictive scores generated by the predictive model correspond to ground-truth predictive outcomes corresponding to the noted retrospective predictive scores. In some embodiments, a predictive output value may be said to correspond to a corresponding ground-truth value if the similarity and/or closeness between the predictive output value and the ground-truth value exceeds a similarity threshold and/or a closeness threshold (e.g., if the two values are the same).

The term "retrospective predictive score" refers to a cross-model predictive score generated by applying a predictive model (e.g., at a previous time) to a particular predictive input. For example, by applying a predictive model to a predictive input associated with a merchant identifier, the predictive model may have previously determined a merchant promotional outreach interest prediction of 60%, which may be a retrospective predictive score for the merchant identifier.

The term "retrospective ground-truth predictive outcome" refers to a collection of one or more data items that indicate, for a corresponding retrospective predictive score associated with a predictive input, a predictive score designated as an empirical and/or observed predictive score for the predictive input. For example, by applying a predictive model to a predictive input associated with a merchant identifier, the predictive model may have previously determined a merchant promotional outreach interest prediction of 60%, which may be a retrospective predictive score for the merchant identifier. In that example, if the retrospective ground-truth predictive outcome for the retrospective predictive score is 100%, then a comparison of the retrospective predictive score for the merchant identifier determined by the predictive model and the retrospective ground-truth predictive outcome for the retrospective predictive score may indicate a lack of correspondence between the retrospective predictive score and the corresponding retrospective ground-truth predictive outcome.

The term "cross-model verification" refers to a computer-implemented process for determining a level of accuracy of a prediction generated by an unselected predictive model based on the predictive input. For example, cross-model verification for a predictive model may indicate that the predictive model has a 70% accuracy rate for predictions generated by the unselected predictive model based on the predictive input.

The term "verification predictive score" refers to a cross-model predictive score generated by an unselected predictive model associated with a predictive input by applying a predictive model to the predictive input. For example, performing cross-model verification may require that an unselected predictive model associated with a predictive input determine a verification predictive score for the predictive input.

The term "threshold prospective performance time interval" refers to a collection of one or more data items that indicate a time period after determination of a cross-model predictive output for a predictive input by a selected predictive model for the predictive input, where after expiration of the noted time period the system may obtain a prospective ground-truth success outcome for the predictive input and determine a prospective predictive success score for the predictive input. For example, the threshold prospective performance time interval for a particular predictive input of two or more predictive inputs associated with two or more merchant identifiers may be the estimated time period for promotional outreach to the two or more merchant identifiers. The threshold prospective performance time interval may be determined using a backtest predictive model that is configured to generate an optimal threshold perspective performance time interval based on historical data.

The term "prospective ground-truth success outcome" refers to a collection of one or more data items that indicate, for a predictive input, an empirical and/or observed prediction for the predictive input after obtaining empirical and/or observed data for the predictive input during the threshold prospective performance time interval associated with the predictive input. For example, if the predictive input relates to a merchant identifier and the prediction relates to a merchant promotional outreach interest prediction for the merchant identifier, the prospective ground-truth success outcome for the prediction may describe an observed merchant promotional outreach interest prediction based on merchant outreach during a particular time period, wherein the time period may be the threshold prospective performance time interval for the prediction.

The term "prospective predictive success score" refers to a collection of one or more data items that indicate, for a predictive model, a level of accuracy of a prediction generated by the unselected predictive model based on the predictive input. For example, the prospective predictive success score for a selected predictive model associated with a predictive input may be determined based on the prospective ground-truth success outcome for the predictive input and the cross-model predictive score for the predictive input. As another example, the prospective predictive success score for an unselected predictive model associated with a predictive input may be determined based on a recent ground-truth success outcome for the predictive input and the verification predictive score associated with the unselected predictive model.

The term "performance metric" refers to a collection of one or more data items that describe one or more expected and/or desired performance objectives for a computing device. For example, a performance metric for a computing device may specify a particular end-user response speed range for the computing device. As another example, a performance metric for a computing device may specify a particular processing load range for the computing device. As yet another example, a performance metric for a computing device may specify a particular storage load range for the computing device.

The term "end-user response speed" refers to a collection of one or more items that indicate a speed of processing one or more end-user requests by a computing device to generate one or more corresponding end-user outputs. For example, the end-user response speed for a computing device may indicate speed of processing end-user prediction requests by the computing device.

The term "cross-model range conversion operations" refers to a collection of one or more data items that define operations for transforming a range of at least one model-specific predictive score determined by the predictive model form a model-specific range to a cross-model range. For example, cross-model range operations may include operations for transforming integer numeric values to percentile values.

The term "model-specific range" refers to a collection of one or more data items that define a range of a model-specific predictive score determined by a predictive model. Examples of model-specific ranges include unbounded numeric ranges (e.g., all positive values), bounded numeric values (e.g., all positive values between 1 and 20), alphabetical values, etc.

The term "cross-model range" refers to a collection of one or more data items that define a range of a cross-model predictive score determined by a predictive model. Examples of cross-model ranges include percentile ranges (e.g., all real values between 0% and 100%).

The term "predictive ranking" refers to a collection of one or more data items that indicate, for one or more predictive inputs, a ranking of the one or more predictive inputs based on the cross-model predictive scores for the one or more predictive inputs. For example, for three predictive inputs A, B, C having cross-model predictive scores 10%, 70%, and 20% respectively, the predictive ranking of the three predictive inputs may be as follows: B, C, A.

The term "candidate merchant identifier" refers to a collection of one or more data items that uniquely identify a provider of goods and/or services. For example, a candidate merchant identifier may uniquely identify a provider of goods and/or services that can be a potential target of and/or is deemed a potential target of a merchant promotional outreach.

The term "candidate merchant data structure" refers to a collection of one or more data items that contain digital information about one or more properties of one or more providers each uniquely identified by a corresponding candidate merchant identifier. For example, the candidate merchant data structure for a candidate merchant identifier may contain digital information about one or more of a promotional outreach responsiveness of a provider uniquely identified by the corresponding candidate merchant identifier, revenue profile of a provider uniquely identified by the corresponding candidate merchant identifier, operational profile of a provider uniquely identified by the corresponding candidate merchant identifier, promotional expenditures of a provider uniquely identified by the corresponding candidate merchant identifier, etc. For example, candidate merchant data structures may include information related to one or more of:

number of merchants that have live deals
    number of merchants that have featured deals
    number of merchants that have transactions
    sum of the number of available days
    sum of the number of featured days from each merchant
    sum of the number of transactions from each merchant
    avg_all_prior
    avg_same_service_prior
    avg_percentile_prior
    avg_svc_percentile_prior
    prior_campaigns
    top_merchant_campaign
    this_year_prior_six_pct
    last_year_next_six_pct
    pop_service
    pop_merchant_division_permalink
    pop_service header
    comp_bookings
    first_comp_tbtw
    last_comp_tbtw
    tbtwrun
    roll12mo_users
    research_ranking
    lead_source
    subs_within5
    distance_to_division_center
    hyperlocal_rank
    n_locations
    online_review_n_reviews
    social_media_fans
    search_engine_n_reviews
    search_engine_rating_nrm
    online_review_rating
    ta_rating
    online_review_price
    subdivision_pg
    units_avail
    this_year_prior_six
    last_year_next_six
    deal_month
    quarter
    julianx The term "merchant promotional outreach interest prediction" refers to a collection of one or more data items that indicate, for a candidate merchant identifier, a predicted and/or estimated likelihood that a promotional outreach to the merchant identifier would be successful. For example, the merchant promotional outreach interest for a particular merchant identifier may indicate a promotional outreach to a provider associated with the merchant identifier has a 70% likelihood of success.

The term "interested merchant identifier" refers to a particular candidate merchant identifier whose corresponding merchant promotional outreach interest prediction indicates a sufficiently high predicted and/or estimated likelihood that a promotional outreach to the particular candidate merchant would be successful. For example, an interested merchant may be a merchant identifier whose corresponding merchant promotional outreach interest prediction exceeds a threshold. As another example, an interested merchant may be a merchant of two or more candidate whose corresponding merchant promotional outreach interest prediction is among the top n merchant promotional outreach interests for the two or more candidate merchant identifiers.

The term "randomly-selected predictive model" refers to any predictive model selected by a weighted random selection which has not yet been designated a selected predictive model for a predictive input. For example, if two or more predictive models include a neural network predictive model and a Bayesian inference network predictive model, a weighted random selection may select the Bayesian inference predictive model, in which case the Bayesian inference predictive model may be a randomly-selected predictive model.

The term "candidate model-specific predictive score" refers to a model-specific predictive score generated by a randomly-selected predictive model. For example, if a Bayesian inference predictive model has been selected by a weighted random selection but has not yet been designated as a selected predictive model for a predictive input, a model-specific predictive score generated by the Bayesian inference predictive model may be a candidate model-specific predictive score.

The term "candidate cross-model predictive score" refers to a cross-model predictive score generated by a randomly-selected predictive model. For example, if a Bayesian inference predictive model has been selected by a weighted random selection but has not yet been designated as a selected predictive model for a predictive input, a cross-model predictive score generated by the Bayesian inference predictive model may be a candidate cross-model predictive score.

The term "candidate cross-model score adoption data" refers to a collection of one or more data items that indicate requirements for whether a randomly-selected predictive model should be adopted as a selected predictive model for a predictive based on at least one candidate cross-model predictive score generated by a randomly-selected predictive model. For example, candidate cross-model score adoption data may indicate that a randomly-selected predictive model should be designated as a selected predictive model for a predictive input if each candidate model-specific predictive score associated with the predictive model has a threshold degree of accuracy.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present disclosure may operate. The architecture 100 includes one or more client computing devices, such as a client computing device 101, that interact with a predictive analysis system 102 over a communication network 103 to transmit predictive analysis requests. In response to receiving a predictive analysis request from a client computing device 101, the predictive analysis system 102 may perform a predictive analysis task corresponding to the predictive analysis request to generate a predictive analysis output corresponding to the predictive analysis request and the predictive analysis task. The predictive analysis system 102 may then transmit the generated predictive analysis output to the client computing device 101.

For example, the client computing device 101 may be a computing device associated with a promotional agent user profile which transmits (over the communication network 103) predictive analysis requests seeking merchant promotional outreach interest predictions associated with particular candidate merchant identifiers. In response, the predictive analysis system 102 may perform predictive analysis tasks configured to determine the merchant promotional outreach interest predictions in order to generate, for each candidate merchant identifier, a merchant promotional outreach interest prediction, which may be a predictive analysis output. The predictive analysis system 102 may then provide the generated merchant promotional outreach interest predictions to the client computing device 101.

As another example, the client computing device 101 may be a computing device associated with a promotional agent user profile which transmits (over the communication network 103) predictive analysis requests seeking consumer promotional outreach interest predictions associated with particular candidate consumers. In response, the predictive analysis system 102 may perform predictive analysis tasks configured to determine the consumer promotional outreach interest predictions in order to generate, for each candidate consumer, a consumer promotional outreach interest prediction, which may be a predictive analysis output. The predictive analysis system 102 may then provide the generated consumer promotional outreach interest predictions to the client computing device 101.

As yet another example, the client computing device 101 may be a computing device associated with a healthcare professional which transmits (over the communication network 103) predictive analysis requests seeking patient health predictions associated with particular candidate patients. In response, the predictive analysis system 102 may perform predictive analysis tasks configured to determine the patient health predictions in order to generate, for each candidate patient, a patient health prediction, which may be a predictive analysis output. The predictive analysis system 102 may then provide the generated patient health predictions to the client computing device 101.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network 103 may include a cellular telephone, a 902.11, 902.16, 902.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the predictive analysis server 111. In one embodiment, the protocol is a custom protocol of JSON objects sent via a Websocket channel. In one embodiment, the protocol is JSON over RPC, JSON over REST/HTTP, and the like.

A client computing device 101 may be any computing device as defined below. Electronic data received by the predictive analysis server 111 from the client computing devices 101 may be provided in various forms and via various methods. For example, the client computing devices 101 may include desktop computers, laptop computers, smartphones, netbooks, tablet computers, wearables, and the like. An example architecture for a client computing device 101 is depicted in the apparatus 300 of FIG. 3.

In embodiments where a client computing device 101 is a mobile device, such as a smart phone or tablet, the client computing device 101 may execute an "app" to interact with the predictive analysis server 111. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. Additionally or alternatively, the client computing device 101 may interact with the predictive analysis server 111 via a web browser. As yet another example, the client computing device 101 may include various hardware or firmware designed to interface with the predictive analysis server 111.

The predictive analysis system 102 may include a predictive analysis server 111 and a predictive model repository 112. The predictive analysis server 111 may be configured to perform predictive analysis tasks and generate predictive analysis outputs using multiple predictive models, where each predictive model is characterized by one or more parameters. The predictive model repository 112 is configured to store parameters characterizing the multiple predictive models as well as cross-model normalization data for each predictive model of the multiple predictive models. For example, the predictive model repository 112 may store weights and/or biases characterizing a neural network predictive model, reinforcement learning parameters characterizing a reinforcement learning predictive model, evolutionary parameters characterizing an evolutionary learning predictive model, etc. In an embodiment, the predictive analysis server 111 can generate one or more correlation coefficients characterizing the multiple predictive models based on a correlation statistical measure of a degree of association between variables of the multiple predictive models. Furthermore, the predictive model repository 112 can be configured to store one or more correlation coefficients characterizing the multiple predictive models. Additionally or alternatively, in an embodiment, the predictive analysis server 111 can generate one or more area under the curve parameters characterizing the multiple predictive models based on an area under the curve statistical measure of optimal predictive models. Furthermore, the predictive model repository 112 can be configured to store one or more area under the curve parameters characterizing the multiple predictive models. In certain embodiments, the predictive analysis server 111 can repeatedly analyze and/or generate the parameters characterizing the multiple predictive models and/or the cross-model normalization data for each predictive model. For example, the predictive analysis server 111 can analyze the parameters characterizing the multiple predictive models and/or the cross-model normalization data for each predictive model on a daily basis. Based on the analysis of the parameters characterizing the multiple predictive models and/or the cross-model normalization data for each predictive model, the predictive analysis server 111 can determine one or more modified parameters and/or modified cross-model normalization data for the predictive models. In an embodiment, the predictive analysis server 111 can generate summary statistics for each predictive model based on the analysis of the parameters characterizing the multiple predictive models and/or the cross-model normalization data for each predictive model.

The predictive analysis server 111 may be embodied as a computer or computers. An example architecture for the predictive analysis server 111 is depicted in the apparatus 200 of FIG. 2. The predictive analysis server 111 may provide for sending electronic data and/or receiving electronic data from various sources, including but not limited to the client computing devices 101. For example, the predictive analysis server 111 may receive predictive analysis requests from a client computing device 101 and transmit corresponding predictive analysis outputs to the client computing device 101. In some embodiments, the predictive analysis server 111 may be configured to perform cross-model predictive inference, cross-model predictive score generation, cross-model score verification, and/or cross-model normalization, as further described below.

An example architecture for the predictive analysis server 111 is depicted in the apparatus 200 of FIG. 2. As depicted in FIG. 2, the apparatus 200 includes processor 202, memory 204, input/output circuitry 206, communications circuitry 208, and predictive analysis circuitry 210. The apparatus 200 may be configured to execute the operations described herein with respect to FIGS. 4-7. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In one embodiment, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

As an example, the processor 202 may be configured to maintain one or more communication channels connecting a plurality of client computing devices 101 to enable message sharing/dissemination therebetween. The processor 202 ensures that messages intended for exchange between the client computing devices 101 within the particular communication channel are properly disseminated to those client computing devices 101 for display within respective display windows provided via the client computing devices 101.

Moreover, the processor 202 may be configured to synchronize messages exchanged on a particular communication channel with a database for storage and/or indexing of messages therein. In certain embodiments, the processor 202 may provide stored and/or indexed messages to the interface computing entity 109 for dissemination to client computing devices 101.

In one embodiment, the apparatus 200 may include input/output circuitry 206 that may, in turn, be in communication with processor 202 to provide output to the user and, in one embodiment, to receive an indication of a user input. The input/output circuitry 206 may comprise a user interface and may include a display, and may comprise a web user interface, a mobile application, a client computing device, a kiosk, or the like. In one embodiment, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network.

For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Predictive analysis circuitry 210 includes hardware configured to execute operations configured to perform cross-model predictive inference, cross-model predictive score generation, cross-model score verification, and/or cross-model normalization, as further described below. The predictive analysis circuitry 210 may utilize processing circuitry, such as the processor 202, to perform these actions. However, it should also be appreciated that, In one embodiment, the predictive analysis circuitry 210 may include a separate processor, specially configured Field Programmable Gate Array (FPGA), or Application Specific Integrated Circuit (ASIC) for performing the functions described herein. The predictive analysis circuitry 210 may be implemented using hardware components of the apparatus configured by either hardware or software for implementing these planned functions.

An example architecture for a client computing device 101 is depicted in the apparatus 300 of FIG. 3. As depicted in FIG. 3, the apparatus 300 includes processor 301, memory 303, input/output circuitry 305, and communications circuitry 307. Although these components 301-307 are described with respect to functional limitations, it should be understood that the particular implementations necessarily include the use of particular hardware. It should also be understood that certain of these components 301-307 may include similar or common hardware. For example, two sets of circuitries may both leverage use of the same processor, network interface, storage medium, or the like to perform their associated functions, such that duplicate hardware is not required for each set of circuitries.

In one embodiment, the processor 301 (and/or co-processor or any other processing circuitry assisting or otherwise associated with the processor) may be in communication with the memory 303 via a bus for passing information among components of the apparatus. The memory 303 is non-transitory and may include, for example, one or more volatile and/or non-volatile memories. In other words, for example, the memory 303 may be an electronic storage device (e.g., a computer-readable storage medium). The memory 303 may be configured to store information, data, content, applications, instructions, or the like for enabling the apparatus 300 to carry out various functions in accordance with example embodiments of the present disclosure. For example, the memory 303 may be configured to cache messages exchanged on one or more predictive analysis, such that the processor 301 may provide various messages to client computing devices (e.g., on an as needed or as requested basis).

The processor 301 may be embodied in a number of different ways and may, for example, include one or more processing devices configured to perform independently. In some preferred and non-limiting embodiments, the processor 301 may include one or more processors configured in tandem via a bus to enable independent execution of instructions, pipelining, and/or multithreading.

In some preferred and non-limiting embodiments, the processor 301 may be configured to execute instructions stored in the memory 303 or otherwise accessible to the processor 301. In some preferred and non-limiting embodiments, the processor 301 may be configured to execute hard-coded functionalities. As such, whether configured by hardware or software methods, or by a combination thereof, the processor 301 may represent an entity (e.g., physically embodied in circuitry) capable of performing operations according to an embodiment of the present disclosure while configured accordingly. Alternatively, as another example, when the processor 301 is embodied as an executor of software instructions, the instructions may specifically configure the processor 301 to perform the algorithms and/or operations described herein when the instructions are executed.

In one embodiment, the apparatus 300 may include input/output circuitry 305 that may, in turn, be in communication with processor 301 to provide output to the user and, In one embodiment, to receive an indication of a user input. The input/output circuitry 305 may comprise a user interface and may include a display, and may comprise a web user interface, a mobile application, a client computing device, a kiosk, or the like. In one embodiment, the input/output circuitry 305 may also include a keyboard, a mouse, a joystick, a touch screen, touch areas, soft keys, a microphone, a speaker, or other input/output mechanisms.

The communications circuitry 307 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 307 may include, for example, a network interface for enabling communications with a wired or wireless communication network. For example, the communications circuitry 307 may include one or more network interface cards, antennae, buses, switches, routers, modems, and supporting hardware and/or software, or any other device suitable for enabling communications via a network. Additionally or alternatively, the communications circuitry 307 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In one embodiment, one or more external systems (such as a remote cloud computing and/or data storage system) may also be leveraged to provide at least some of the functionality discussed herein.

The term "circuitry" should be understood broadly to include hardware and, in one embodiment, software for configuring the hardware. With respect to components of each apparatus 200, 300, the term "circuitry" as used herein should therefore be understood to include particular hardware configured to perform the functions associated with the particular circuitry as described herein. For example, in one embodiment, "circuitry" may include processing circuitry, storage media, network interfaces, input/output devices, and the like. In one embodiment, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 301 may provide processing functionality, the memory 303 may provide storage functionality, the communications circuitry 307 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a predictive analysis server 111 may include one or more databases configured for storing and/or indexing predictive models associated with the predictive analysis server 111.

Example Data Flows of Embodiments of the Present Disclosure

Various embodiments of the present disclosure address efficiency and reliability challenges for predictive data analysis systems stemming from predictive model diversity by introducing various techniques related to cross-model predictive inference that enable detecting optimal predictive models for individual predictive inputs and applying the detected optimal predictive models to the noted individual predictive inputs. Examples of the noted techniques include cross-model predictive inference, cross-model predictive score generation, cross-model score verification, and cross-model normalization. In an aspect, various embodiments additionally or alternatively improve performance of a processor configured to execute one or more operations associated with various techniques related to cross-model predictive inference. For example, various embodiments improve processing speed and/or reduce a number of computational resources associated with various techniques related to cross-model predictive inference. Furthermore, various embodiments additionally or alternatively improve training of a predictive model associated with cross-model predictive inference, cross-model predictive score generation, cross-model score verification, and/or cross-model normalization. For example, various embodiments additionally or alternatively provide improved or reduced parameters, improved values, improved weights, and/or improved thresholds for a predictive model associated with cross-model predictive inference, cross-model predictive score generation, cross-model score verification, and/or cross-model normalization.

For example, by utilizing some aspects of cross-model predictive inference and some aspects of cross-model predictive score generation, various embodiments of the present disclosure enable selectively utilizing multiple predictive models to process multiple predictive inputs, thus enabling selection of the most optimal predictive model for each predictive input when performing cross-model predictive inferences. In an embodiment, the predictive inputs can be related to marketing leads for merchants of goods or services. As another example, by utilizing some aspects of cross-model score verification, various embodiments of the present disclosure enable determining selection probabilities of individual predictive models based on empirical observations about correspondence of predictions generated by those models and real-world predictions, thus enabling improved detection of optimal predictive models for individual predictive inputs when performing cross-model predictive inferences. As yet another example, by utilizing some aspects of cross-model normalization, various embodiments of the present disclosure enable generating normalized outputs having a cross-model format based on model-specific outputs each having a model-specific format, thus enabling better integration and interoperability between various predictive models when performing cross-model predictive inferences.

Cross-Model Predictive Inference

FIG. 4 is an example flow diagram illustrating performing a cross-model predictive inference. The process 400 illustrated in FIG. 4 is described herein with reference to a predictive analysis server, such as the predictive analysis server 111 of FIG. 1, but can be performed by any system of one or more computers, such as a system that includes the predictive analysis server 111 of FIG. 1. Each block of the flowchart, and combinations of blocks in the flowchart, may be implemented by various means such as hardware, firmware, circuitry and/or other devices associated with execution of software including one or more computer program instructions. For example, one or more of the procedures described in FIG. 4 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As depicted in FIG. 4, the process 400 starts at blocks 401-402 when the predictive analysis server 111 identifies a group of predictive inputs (at block 401) and identifies a group of predictive models (at block 402). Examples of predictive inputs may include predictive inputs associated with candidate merchants, candidate patients, candidate travel paths, etc. For example, in an embodiment, the predictive inputs can be related to data indicative of marketing leads for candidate merchants of goods or services. In certain embodiments, the data indicative of the marketing leads can be related to a particular type of market for the goods or services. Examples of predictive models may include predictive models that include one or more of regression-based models, neural-network-based models, Bayesian-inference-based models, etc. In an embodiment, the predictive models can include two or more predictive models that generate respective rankings of merchants that provide goods and/or services. In an aspect, a first predictive model from the predictive models can be different than a second predictive model from the predictive models. For instance, the first predictive model and the second predictive model can be configured with different architectural complexities and/or different operational requirements. In one example, the first predictive model and the second predictive model can be different types of machine learning models. However, the first predictive model and the second predictive model can be trained with corresponding training data. In certain embodiments, the second predictive model can be trained based on data associated with the first predictive model. Additionally or alternatively, the first predictive model can be trained based on data associated with the second predictive model. In an embodiment, a predictive model can be an incrementality model that provides merchant ranking based on incremental value.

In certain embodiments, the predictive inputs can be obtained from a candidate merchant data structure. A merchant can be, for example, a potential target for a merchant promotional outreach and/or an electronic communication for a merchant promotional outreach. In an aspect, an electronic communication for a merchant promotional outreach can be transmitted to a consumer device (e.g., a client computing device from the client computing devices 101) to facilitate rendering of data associated with the merchant promotion outreach via an electronic interface (e.g., a graphical user interface) of the consumer device. In certain embodiments, a ranking of merchants can, for example, rank merchants based on predicted value of transmitting an electronic communication (e.g., an electronic communication for a merchant promotion outreach) to a consumer device associated with a merchant in order to maximize efficiency and/or revenue provided by merchants. For instance, a ranking of merchants can, for example, rank merchants based on a predicted incremental value with respect to a given market for a good and/or service. In certain embodiments, a ranking of merchants can be an optimized list of merchants to facilitate a decrease in a number of computing resources for transmitting electronic communications to one or more consumer devices. Accordingly, with the ranking of merchants provided by the prediction models, bandwidth of a communication network associated with transmission of electronic communications can also be improved.

At block 403, the predictive analysis server obtains a model selection probability distribution that defines, for each predictive model identified in block 402, a respective selection probability score. In some embodiments, the predictive models identified in block 402 include a champion predictive model and a challenger predictive model, and the selection probability score for a champion predictive model exceeds the selection probability score for any predictive challenger model. In some embodiments, the challenger predictive model can be a modified version of the champion predictive model. For instance, in certain embodiments, one or more operations of the challenger predictive model can be different than one or more operations of the champion predictive model. Additionally or alternatively, one or more parameters of the challenger predictive model can be different than one or more parameters of the champion predictive model. Additionally or alternatively, a value of one or more parameters of the challenger predictive model can be different than corresponding parameters of the champion predictive model. In certain embodiments, the model selection probability distribution can be a collection of one or more data items that indicate a selection probability score for the champion predictive model and the challenger predictive model. For example, the model selection probability distribution may indicate a first selection probability score (e.g., 80% selection probability score) for the champion predictive model and a second selection probability score (e.g., 20% selection probability score) for the challenger predictive model.

In some embodiments, the selection probability score for at least a first predictive model of the predictive models identified in block 402 is determined based on the retrospective prediction-outcome correspondence of the first predictive model compared to the retrospective prediction-outcome correspondences of one or more second predictive models identified in block 402. In some embodiments, the selection probability score for a first predictive model is adjusted after each iteration of performing cross-model score verification for the identified predictive models, as described below. In some embodiments, the champion or challenger designation of each predictive model is adjusted after each iteration of performing cross-model score verification for the identified predictive models, as described below. In some embodiments, selection of champion predictive model is based on one or more rules for model selection (e.g., a rule that requires a particular predictive model for predictive inputs having particular category, such as a rule that requires selecting a particular predictive model for restaurants).

At block 404, the predictive analysis server 111 obtains cross-model normalization data for each predictive model identified in block 402. In some embodiments, the cross-model normalization data for at least one predictive model of the predictive models defines one or more cross-model conversion operations for the predictive model. The one or more cross-model conversion operations for a respective predictive model can be configured to convert the cross-model predictive output for the respective predictive model each having an output-specific range to a cross-model value for the predictive model having a cross-model range. Furthermore, each cross-model predictive score for a predictive model can be determined based on a respective cross-model value for the predictive model. In some embodiments, the cross-model normalization data for at least one predictive model converts two or more model-specific predictive scores for the predictive model into a cross-model value for the predictive model. The cross-model value can be, for example, a prediction for a degree of value (e.g., an incremental value) added to a given market for a good and/or service provided by a merchant.

At block 405, the predictive analysis server 111 determines a cross-model predictive score for each predictive input identified in block 401. In some embodiments, the predictive analysis system 102 determines a cross-model predictive score for a particular predictive input based on at least one of the model selection probability distribution obtained in block 403 and/or each cross-model normalization data for a predictive model obtained in block 404. In some embodiments, the predictive analysis server 111 determines for each predictive input of the plurality of predictive inputs, an initial ranking predictive score by applying the champion predictive model to the predictive input. In some of those embodiments, determining the cross-model predictive score for each predictive input of the identified predictive inputs includes determining each cross-model predictive score in a predictive score generation order, where the predictive score generation order is determined based on each initial ranking predictive score associated with a predictive input of the identified predictive inputs. For example, if the predictive score generation order indicates that a first predictive input has a higher initial ranking predictive score than a second predictive input, the predictive analysis server 111 may determine the cross-model predictive score for the first predictive input before determining the cross-model predictive score for the second predictive input.

In some embodiments, operations of block 405 with respect to a predictive input may be performed in accordance with the operations depicted in various blocks of the process depicted in FIG. 5. The process depicted in FIG. 5 begins at block 501 when the predictive analysis server 111 determines a selected predictive model for the predictive input. In some embodiments, the predictive analysis server 111 determines the selected predictive model for the predictive input based on a weighted random selection for the predictive input characterized by one or more random selection parameters for the predictive input. In some embodiments, at least one random selection parameter of the one or more random selection parameters is determined based on the model selection probability distribution. In some embodiments, the model selection probability is an uniform distribution of the predictive models. For example, in some embodiments, given a uniform distribution {40%, 60%} for two predictive models A and B respectively, the predictive analysis server 111 randomly selects predictive models for predictive inputs in a manner that causes predictive model A to be selected for 40% of the predictive inputs and predictive model B to be selected for 60% of the predictive inputs.

In some embodiments, the predictive models identified in block 402 include a champion predictive model and a challenger predictive model, and the random selection parameters for a champion predictive model are configured to cause the champion predictive model to be selected at a higher predicted frequency than any challenger predictive model. In some embodiments, at least one random selection parameter for a first predictive model identified in block 402 is determined based on the retrospective prediction-outcome correspondence of the first predictive model compared to the retrospective prediction-outcome correspondences of one or more second predictive models identified in block 402. In some embodiments, at least one random selection parameter for at least a first predictive model of the predictive models is adjusted after each iteration of performing cross-model score verification, as described below. In some embodiments, the champion or challenger designation of each predictive model is adjusted after performing each cross-model score verification, as described below. In some embodiments, the cross-model score verification is a backtest cross-model score verification (e.g., a cross-model score verification based on historical data). In some embodiments, the cross-model score verification is a forward-test cross-model verification (e.g., a cross-model score verification based on incoming data). In some embodiments, the cross-model score verification includes both a backtest cross-model score verification and a forward-test cross-model score verification.

In certain embodiments, a merchant ranking test (e.g., a merchant acquisition ranking evaluation) can be employed to test whether a correlation measure between a predicted rank (e.g., a model score rank) and an observed rank (e.g., a financial metric rank) from the champion predictive model and the challenger predictive model satisfies a defined criterion. For example, the merchant ranking test (e.g., a merchant acquisition ranking evaluation) can be employed to determine a degree of difference between the champion predictive model and the challenger predictive model based on the correlation measure. In an aspect, the merchant ranking test can be based on a primary metric associated with predicted metrics for new merchants for a first interval of time (e.g., 30 days), a secondary metric associated with observed metrics for new merchants for the first interval of time (e.g., 30 days), and an auxiliary metric associated with observed metrics for a second interval of time (e.g., 75 days). In an example, the primary metric can be determined for the champion predictive model, the challenger predictive model, a difference between the champion predictive model and the challenger predictive model, a standard deviation between the champion predictive model and the challenger predictive model, a probability value between the champion predictive model and the challenger predictive model, and/or a determined significance between the champion predictive model and the challenger predictive model. Furthermore, the secondary metric can be determined for the champion predictive model, the challenger predictive model, a difference between the champion predictive model and the challenger predictive model, a standard deviation between the champion predictive model and the challenger predictive model, a probability value between the champion predictive model and the challenger predictive model, and/or a determined significance between the champion predictive model and the challenger predictive model. The auxiliary metric can also be determined for the champion predictive model, the challenger predictive model, a difference between the champion predictive model and the challenger predictive model, a standard deviation between the champion predictive model and the challenger predictive model, a probability value between the champion predictive model and the challenger predictive model, and/or a determined significance between the champion predictive model and the challenger predictive model.

In certain embodiments, a merchant financial performance distribution (e.g., a metal segment setup) among one or more segments from the champion predictive model and the challenger predictive model can be compared to determine a degree of difference between the champion predictive model and the challenger predictive model. In an embodiment, at least one parameter of the challenger predictive model can be adjusted based on a degree of difference between the champion predictive model and the challenger predictive model. In another embodiment, the merchant financial performance distribution can be calculated at a particular time between an interval of time for the merchant financial performance distribution. For example, the merchant financial performance distribution can be calculated on a $15^{th}$ day of a month over all scored merchants to represent merchant financial performance throughout the month. In certain embodiments, the merchant financial performance distribution can employ a median value as a statistical measure for comparison. In certain embodiments, quintile analysis can be performed with respect to the merchant financial performance distribution. For example, the merchant financial performance distribution can be divided into multiple segments (e.g. five segments) that respectively correspond to 20% segments of the merchant financial performance distribution. As such, differences between the champion predictive model and the challenger predictive model can be compared based on subsets portions of the merchant financial performance distribution. In certain embodiments, a heatmap can be employed to analyze differences between the champion predictive model and the challenger predictive model. For example, the heatmap can provide a visualization of differences between different portions of the champion predictive model and the challenger predictive model. In certain embodiments, a distribution density plot can be employed to analyze differences between the champion predictive model and the challenger predictive model. For example, the distribution density plot can provide a visualization of differences between different portions of the champion predictive model and the challenger predictive model.

In some embodiments, the champion predictive model and the challenger predictive model can be tested in parallel. For example, generation and/or verification of scores for the champion predictive model and the challenger predictive model can be simultaneously performed. In an embodiment, a first score can be generated for the champion predictive model and a second score can be generated for the challenger predictive model. The first score and the second score can be generated in parallel (e.g., the first score and the second score can be simultaneously generated). Furthermore, the second score for the challenger predictive model can be compared to the first score for the champion predictive model.

In another embodiment, scoring of the champion predictive model and the challenger predictive model can be evaluated based on two or more objective functions. An objective function can be a set of constraints related to one or more metrics for one or more merchants. Furthermore, an objective function can be related to one or more goals related to one or more merchants. In an aspect, an objective function can include a first constraint related to a first metric, a second constraint related to a second metric, etc. In another aspect, a metric can include, but is not limited to, information related to a geographical location, purchase behavior of a consumer, revenue for a particular market for a good or service, a type of good or service, etc. In an example, scoring of the champion predictive model and the challenger predictive model can be evaluated based on a first objective function (e.g., a purchase frequency for a particular good or service), a second objective function (e.g., incremental revenue at a particular geographical location), and a third objective function (e.g., revenue at multiple geographical locations). In an embodiment, the second score for the challenger predictive model can be compared to the first score for the champion predictive model based on the first objective function (e.g., the purchase frequency for a particular good or service), the second objective function (e.g., the incremental revenue at the particular geographical location), and the third objective function (e.g., the revenue at the multiple geographical locations). As such, different model parameters between the champion predictive model and the challenger predictive model can be tested and/or evaluated. In certain embodiment, the champion predictive model or the challenger predictive model can be selected based on the evaluation of the score for the champion predictive model and the respective scores for the challenger predictive model.

In some embodiments, at least one random selection parameter may be defined by at least one selection probability score for a predictive model. In some embodiments, at least one random selection parameter may be defined by at least one property of at least one predictive input. In some embodiments, at least one random selection parameter may be defined by a random number generation process.

In some embodiments, operations of block 501 may be performed in accordance with the operations depicted in various blocks of the process depicted in FIG. 6. The process depicted in FIG. 6 begins at block 601 when the predictive analysis server 111 generates a first randomly-selected predictive model for the predictive input identified in block 401. In some embodiments, the predictive analysis server 111 generates the first randomly-selected predictive model based on the weighted random selection for the predictive models identified in block 402. For example, to generate the first randomly-selected predictive model, the predictive analysis server 111 may randomly select a predictive model among the predictive model identified in block 402 as the first randomly-selected predictive model, where the random selection may be performed based on a probability distribution determined based on the random selection parameters for the weighted random selection for the predictive models.

At block 602, the predictive analysis server 111 determines a first candidate cross-model predictive score for the first randomly-selected predictive model. In some embodiments, to determine the first candidate cross-model predictive score, the predictive analysis server 111 identifies the cross-model predictive score for the predictive input generated by the first randomly-selected predictive model and determines the first candidate cross-model predictive score by applying the first randomly-selected predictive model to the predictive input using to generate one or more first candidate model-specific predictive scores and subsequently performs cross-model normalization on the one or more first candidate model-specific predictive scores to generate the first candidate cross-model predictive score.

At block 603, the predictive analysis server 111 determines whether the first candidate cross-model predictive score for the predictive input satisfies cross-model score adoption data for the predictive models identified in block 402. In some embodiments, the cross-model score adoption data may indicate whether the predictive analysis server 111 should adopt the first candidate cross-model predictive score for the predictive input as the cross-model predictive score for the predictive input, e.g., based on one or more properties of the predictive input and/or one or more properties of the first candidate cross-model predictive score.

At block 604, in response to determining that the first candidate cross-model predictive score for the predictive input satisfies the cross-model score adoption data, the predictive analysis server 111 adopts the first candidate cross-model predictive score as the cross-model predictive score for the predictive input. At block 605, in response to determining that the first candidate cross-model predictive score for the predictive input fails to satisfy the cross-model score adoption data, the predictive analysis server 111 selects an alternative cross-model predictive score as the cross-model predictive score. In some embodiments, in response to determining that the first candidate cross-model predictive score for the predictive input fails to satisfy the cross-model score adoption data, the predictive analysis server 111 modifies the predictive inputs to eliminate the predictive input.

In some embodiments, to determine an alternative cross-model predictive score, the predictive analysis server 111 determines a second candidate cross-model predictive score by applying a champion predictive model to the predictive input to generate one or more second candidate model-specific predictive scores and performing cross-model on the one or more second candidate model-specific predictive scores to generate the second candidate cross-model predictive score. The predictive analysis server 111 then determines whether the second candidate cross-model predictive score for the predictive input satisfies cross-model score adoption data for the predictive models. In response to determining that the second candidate cross-model predictive score for the predictive input satisfies the cross-model score adoption data, the predictive analysis server 111 adopts the second candidate cross-model predictive score as the cross-model predictive score for the predictive input.

In some of those embodiments, in response to determining that the second candidate cross-model predictive score for the predictive input fails to satisfy the cross-model score adoption data, the predictive analysis server 111 performs a second weighted random selection for the predictive input to determine a third randomly-selected predictive model of the predictive models. In an embodiment, the predictive analysis server 111 determines a third candidate cross-model predictive score by applying the third randomly-selected predictive model to the predictive input to generate one or more third candidate model-specific predictive scores and performing cross-model normalization on the one or more third candidate model-specific predictive scores to generate the second candidate cross-model predictive score. In another embodiment, the predictive analysis server 111 determines whether the third candidate cross-model predictive score for the predictive input satisfies cross-model score adoption data for the predictive models. Additionally, in certain embodiments in response to determining that the third candidate cross-model predictive score for the predictive input satisfies the cross-model score adoption data for the predictive models, the predictive analysis server 111 adopts the third candidate cross-model predictive score as the cross-model predictive score for the predictive input.

In some embodiments, to determine an alternative cross-model predictive score, the predictive analysis server 111 performs a second weighted random selection for the predictive input to determine a second randomly-selected predictive model of the predictive models. The predictive analysis server 111 then determines a second candidate cross-model predictive score by applying a second randomly-selected predictive model to the predictive input to generate one or more second candidate model-specific predictive scores and performing cross-model normalization on the one or more second candidate model-specific predictive scores to generate the second candidate cross-model predictive score. The predictive analysis server 111 then determines whether the second candidate cross-model predictive score for the predictive input satisfies cross-model score adoption data for the predictive models. In response to determining that the second candidate cross-model predictive score for the predictive input satisfies the cross-model score adoption data for the predictive models, the predictive analysis server 111 adopts the second candidate cross-model predictive score as the cross-model predictive score for the predictive input.

In some of those embodiments, in response to determining that the second candidate cross-model predictive score for the predictive input fails to satisfy the cross-model score adoption data, the predictive analysis server 111 identifies the cross-model predictive score for the predictive input generated by the first randomly-selected predictive model. In an embodiment, the predictive analysis server 111 determines a first candidate cross-model predictive score by applying the first randomly-selected predictive model to the predictive input to generate one or more first candidate model-specific predictive scores and performing the cross-model normalization on the one or more first candidate model-specific predictive scores to generate the first candidate cross-model predictive score. In another embodiment, the predictive analysis server 111 determines whether the first candidate cross-model predictive score for the predictive input satisfies cross-model score adoption data for the predictive models. Additionally, in certain embodiments in response to determining that the first candidate cross-model predictive score for the predictive input satisfies the cross-model score adoption data for the predictive models, the predictive analysis server 111 adopts the first candidate cross-model predictive score as the cross-model predictive score for the predictive input.

Returning to FIG. 5, the depicted process continues at block 502 when the predictive analysis server 111 determines one or more model-specific predictive scores for the predictive input by applying the respective selected predictive model for the predictive input to the predictive input. In some embodiments, the predictive analysis server 111 provides the predictive input as an input to the selected predictive models, where the selected predictive model is configured to process the predictive input to generate the one or more model-specific predictive scores. In some embodiments, each of the one or more model-specific predictive scores has a model-specific range that may be different from a cross-model range of a cross-model predictive score determined in the subsequent block 503.

At block 503, the predictive analysis server 111 determines a cross-model predictive score for the predictive input by performing cross-model normalization on the one or more model-specific predictive scores associated with the predictive input. In some embodiments, the predictive analysis server 111 performs cross-model normalization on the one or more mode-specific predictive scores to generate a cross-model predictive score. In some embodiments, the predictive analysis server 111 performs cross-model normalization on the one or more model-specific predictive scores generated by a selected predictive model based on the cross-model normalization data for the selected predictive model. In some embodiments, each cross-model normalization data for a predictive model defines one or more cross-model conversion operations for the predictive model. In some embodiments, the one or more cross-model conversion operations for a respective predictive model are configured to convert the cross-model predictive output for the respective predictive model each having an output-specific range to a cross-model value having a cross-model range. In some embodiments, each cross-model predictive score generated by cross-model normalization is determined based on a respective cross-model value generated based on the cross-model normalization data associated with the cross-model normalization.

Returning to FIG. 4, the process 400 continues at block 406 when the predictive analysis server 111 determines, based on each cross-model predictive score for a predictive input obtained in block 401, a cross-model predictive output. In some embodiments, to determine a cross-model predictive output based on each cross-model predictive score, the predictive analysis server 111 determines a predictive ranking of the predictive inputs based on each cross-model predictive score associated with a predictive input. Additionally, in some embodiments, the predictive analysis server 111 determines the cross-model predictive output based on the predictive ranking of the predictive inputs. For example, the predictive analysis server 111 may randomly select a predictive input of the top m predictive inputs in the predictive ranking, where m may for example be equal to a ratio (e.g., one-fourth) of a total number of predictive inputs and/or may be equal to a constant number (e.g., five). In certain embodiments, a predictive ranking can be a ranking of merchants that provide goods and/or services. In certain embodiments, an electronic communication for a merchant promotional outreach can be transmitted to a consumer device (e.g., a client computing device from the client computing devices 101) to facilitate rendering of data associated with the merchant promotional outreach via an electronic interface (e.g., a graphical user interface) of the consumer device. For example, in certain embodiments, an electronic communication related to a merchant promotional outreach for a merchant of goods or services can be generated based on the cross-model predictive output and/or the predictive ranking. In certain embodiments, the cross-model predictive output can indicate one or merchants (e.g., one or more merchant identifiers) for a merchant promotional outreach. Furthermore, the electronic communication related to the merchant promotional outreach can be transmitted to a consumer device (e.g., a client computing device from the client computing devices 101) to facilitate rendering data associated with the merchant promotional outreach via an electronic interface (e.g., a graphical user interface) of the consumer device. In certain embodiments, the cross-model predictive output can be additionally or alternatively employed to update one or more predictive models. For example, one or more predictive models can be retrained based on the cross-model predictive output. In certain embodiments, random selection of predictive input can facilitate a decrease in a number of computing resources for generating a predictive ranking.

In some embodiments, the predictive analysis server 111 identifies a challenger predictive model of the predictive models identified in block 402. In some of those embodiments, the predictive analysis server 111 identifies the champion predictive model includes identifying, for each predictive model of the identified predictive models, a retrospective predictive success score. The retrospective predictive success score for each predictive model can, for example, define a retrospective prediction-outcome correspondence for the predictive model between one or more retrospective predictive scores generated by the predictive model and one or more retrospective ground-truth predictive outcomes corresponding to the one or more past predictive scores. In an embodiment, the predictive analysis server 111 determines the champion predictive model based on each retrospective predictive success score associated with a predictive model of the identified predictive models.

In some embodiments, each predictive input of the plurality of predictive inputs is associated with a candidate merchant identifier. In an aspect, each candidate merchant identifier of the plurality of candidate merchant identifiers can be associated with a candidate merchant data structure. In another aspect, each predictive input associated with a candidate merchant identifier comprises the candidate merchant data structure associated with the candidate merchant identifier. Additionally, each cross-model predictive score for a predictive input of the plurality of predictive inputs can indicate a merchant promotional outreach interest prediction for the candidate merchant identifier associated with the predictive input. The cross-model predictive output can indicate, for example, a threshold number of merchant identifiers whose corresponding merchant promotional outreach interest prediction is highest among each merchant promotional outreach interest prediction associated with a candidate merchant identifier.

Cross-Model Score Verification

FIG. 7 is an example flow diagram illustrating performing cross-model score verification for a predictive input. The process 700 illustrated in FIG. 7 is described herein with reference to a predictive analysis server, such as the predictive analysis server 111 of FIG. 1, but can be performed by any system of one or more computers, such as a system that includes the predictive analysis server 111 of FIG. 1. Each block of the flowchart, and combinations of blocks in the flowchart, may be implemented by various means such as hardware, firmware, circuitry and/or other devices associated with execution of software including one or more computer program instructions. For example, one or more of the procedures described in FIG. 7 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As depicted in FIG. 7, the process 700 starts at block 701 when the predictive analysis server 111 identifies one or more unselected predictive models for the predictive input. In some embodiments, to determine the one or more unselected predictive models for the predictive input, the predictive analysis server 111 first identifies a selected predictive model for the predictive input (e.g., by determining the selected predictive model for the predictive input as described with reference to block 501 of FIG. 5 and/or with reference to various blocks of FIG. 6). Subsequent to identifying the selected predictive model, the predictive analysis server 111 determines any identified predictive models that are not designated as the selected predictive model for the predictive input as unselected predictive models for the predictive input.

At block 702, the predictive analysis server 111 determines, for each unselected predictive model of the one or more unselected predictive models, a verification predictive score by applying the unselected predictive model to the predictive input. In some embodiments, the predictive analysis server 111 applies each unselected predictive model for a predictive input to the predictive input to determine a corresponding verification predictive score. In some embodiments, the predictive analysis server 111 applies each unselected predictive model for a predictive input to a predictive input to determine a corresponding model-based verification predictive score, applies cross-model normalization for an unselected predictive model to the corresponding model-based verification predictive score for the unselected predictive model to determine a corresponding cross-model verification predictive score, and determines each corresponding verification predictive score for an unselected predictive model based on the corresponding cross-model verification predictive score for the unselected predictive model (e.g., adopts each corresponding cross-model verification predictive score for an unselected predictive model as the corresponding verification predictive score for the unselected predictive model).

At block 703, the predictive analysis server 111 obtains a prospective ground-truth success outcome for the predictive input corresponding to the threshold prospective performance time interval. The predictive analysis server 111 can obtain the prospective ground-truth success outcome, for example, subsequent to expiration of a threshold prospective performance time interval after determining the cross-model predictive output for a predictive input. In certain embodiments, the prospective ground-truth success outcome can describe an observed merchant promotional outreach interest prediction. The observed merchant promotional outreach interest prediction can, for example, be based on merchant outreach during the threshold prospective performance time interval.

At block 704, the predictive analysis server 111 determines a prospective predictive success score for each predictive model of the plurality of predictive models. The prospective predictive success score for the selected predictive model can be determined, for example, based on a recent ground-truth success outcome for the predictive input and the cross-model predictive score for the predictive input. Furthermore, each prospective predictive success score for an unselected predictive model of the one or more unselected predictive model can be determined based on the recent ground-truth success outcome for the predictive input and the verification predictive score associated with the unselected predictive model.

In some embodiments, the predictive analysis server adjusts the selection probability score for each predictive model based on the prospective predictive success score for the predictive model. In some embodiments, each cross-model score generation is performed by a first computing device configured to perform the cross-model score generation based on one or more first performance metrics. In some embodiments, each cross-model score verification is performed by a second computing device configured to perform each cross-model score verification based on one or more second performance metrics. In some embodiments, at least one first performance metric of the one or more first performance metrics requires greater end-user response speed than at least one second performance metric of the one or more second performance metrics. In some embodiments, the one or more front-end performance metrics comprise one or more real-time performance metrics.

Exemplary Electronic Interfaces

FIG. 8 is an example electronic interface 800 illustrating performance metrics of merchant acquisition rankings. The electronic interface 800 can be, for example, an electronic interface (e.g., a graphical user interface) of a consumer device. In an embodiment, the electronic interface 800 can be an electronic dashboard that renders one or more graphical elements associated with performance metrics. As illustrated in FIG. 8, the electronic interface 800 includes performance metrics data 802 for a first predictive model, performance metrics data 804 for a second predictive model, performance metrics data 806 for a third predictive model, and performance metrics data 808 for a fourth predictive model. In certain embodiments, the performance metrics data 802, the performance metrics data 804, the performance metrics data 806, and/or the performance metrics data 808 can be presented based on one or more intervals of time. As such, the electronic interface 800 can be employed to more efficiently and/or more accurately identify top merchants and/or optimal predictive models for different metrics.

FIG. 9 is an example electronic interface illustrating performance metrics of merchants based on location. The electronic interface 900 can be, for example, an electronic interface (e.g., a graphical user interface) of a consumer device. In an embodiment, the electronic interface 900 can be an electronic dashboard that renders one or more graphical elements associated with performance metrics. As illustrated in FIG. 9, the electronic interface 900 includes performance metric data 902 associated with different locations, performance metric data 904 associated with trends during different time periods, and performance metric data 904 associated with revenue. In certain embodiments, the electronic interface 900 can include a set of interactive elements 908 that can facilitate modification of a type of performance metric rendered via the performance metric data 902, the performance metric data 904 and/or the performance metric data 906. As such, the electronic interface 900 can be employed to more efficiently and/or more accurately identify top merchants, objectives, categories related to goods or services, locations, and/or other metrics for predictive models.

FIG. 10 is an example electronic interface 1000 illustrating performance metrics of merchant acquisition rankings. The electronic interface 1000 can be, for example, an electronic interface (e.g., a graphical user interface) of a consumer device. In an embodiment, the electronic interface 1000 can be an electronic dashboard that renders one or more graphical elements associated with performance metrics. The electronic interface 1000 can present performance metrics related to predictive models. As illustrated in FIG. 10, the electronic interface 1000 includes performance metrics data 1002 associated with predictive models based on performance metric scores (e.g., a Spearman correlation score) for respective predictive models related to a ranking of merchants for a particular market of goods or services. The electronic interface 1000 also includes performance metrics data 1004 associated with predictive models based on performance metric scores (e.g., area under curve ratio scores) for respective predictive models related to a ranking of merchants for a particular market of goods or services. Furthermore, the electronic interface 1000 includes performance metrics data 1006 associated with predictive models based on performance metric scores (e.g., a Spearman correlation score) for respective predictive models related to a ranking of new merchants. The electronic interface 1000 also includes performance metrics data 1008 associated with predictive models based on performance metric scores (e.g., area under curve ratio scores) for respective predictive models related to a ranking of new merchants. In certain embodiments, the performance metrics data 1002, the performance metrics data 1004, the performance metrics data 1006, and/or the performance metrics data 1008 can be presented based on one or more intervals of time. As such, the electronic interface 1000 can be employed to more efficiently and/or more accurately identify top merchants and/or optimal predictive models for different metrics.

FIG. 11 is an example electronic interface 1100 illustrating performance metrics of merchant acquisition rankings. The electronic interface 1100 can be, for example, an electronic interface (e.g., a graphical user interface) of a consumer device. In an embodiment, the electronic interface 1100 can be an electronic dashboard that renders one or more graphical elements associated with performance metrics. The electronic interface 1100 can present performance metrics related to predictive models. As illustrated in FIG. 11, the electronic interface 1100 includes performance metrics data 1102 associated with predictive models based on performance metric scores (e.g., a Spearman correlation score) for respective predictive models related to a ranking of merchants for a particular market of goods or services. The electronic interface 1100 also includes performance metrics data 1104 associated with predictive models based on performance metric scores (e.g., area under curve ratio scores) for respective predictive models related to a ranking of merchants for a particular market of goods or services. Furthermore, the electronic interface 1100 includes performance metrics data 1106 associated with predictive models based on performance metric scores (e.g., a Spearman correlation score) for respective predictive models related to a ranking of new merchants. The electronic interface 1100 also includes performance metrics data 1108 associated with predictive models based on performance metric scores (e.g., area under curve ratio scores) for respective predictive models related to a ranking of new merchants. In certain embodiments, the performance metrics data 1102, the performance metrics data 1104, the performance metrics data 1106, and/or the performance metrics data 1108 can be presented based on one or more intervals of time. As such, the electronic interface 1100 can be employed to more efficiently and/or more accurately identify top merchants and/or optimal predictive models for different metrics.

FIG. 12 is an example electronic interface 1200 illustrating performance metrics of merchant acquisition rankings. The electronic interface 1200 can be, for example, an electronic interface (e.g., a graphical user interface) of a consumer device. In an embodiment, the electronic interface 1200 can be an electronic dashboard that renders one or more graphical elements associated with performance metrics. The electronic interface 1200 can present performance metrics related to predictive models. As illustrated in FIG. 12, the electronic interface 1200 includes performance metrics data 1202 associated with predictive models based on performance metric scores (e.g., a percentage ranking vs. cumulative new merchants) for respective predictive models related to a ranking of new merchants. The electronic interface 1200 also includes performance metrics data 1204 associated with predictive models based on performance metric scores (e.g., a percentage ranking vs. cumulative new merchants) for respective predictive models related to a ranking of new merchants. In an embodiment, the electronic interface 1200 can include a predictive model ranking 1206 related to the performance data 1202. For example, the predictive model ranking 1206 can rank predictive models based on respective score values and/or a respective type of performance metric. Furthermore, the electronic interface 1200 can include a predictive model ranking 1208 related to the performance data 1204. For example, the predictive model ranking 1208 can rank predictive models based on respective score values and/or a respective type of performance metric. As such, the electronic interface 1200 can be employed to more efficiently and/or more accurately identify top merchants and/or optimal predictive models for different metrics.

Additional Implementation Details

Although example processing systems have been described in FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client computing device (e.g., for purposes of displaying information/data to and receiving user input from a user interacting with the client computing device). Information/data generated at the client computing device (e.g., a result of the user interaction) can be received from the client computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. An apparatus comprising at least one processor and at least one non-transitory memory comprising program code, wherein the at least one non-transitory memory and the program code are configured to, with the at least one processor, cause the apparatus to:
    obtain a model selection probability distribution, wherein the model selection probability distribution defines, for each predictive model of a plurality of predictive models, a respective selection probability score;
    obtain, for each predictive model of the plurality of predictive models, respective cross-model normalization data;
    determine a cross-model predictive score for each predictive input of a plurality of predictive inputs, wherein determining the cross-model predictive score for the predictive input comprises:
        determining, based on a weighted random selection for the predictive input, a respective selected predictive model of the plurality of predictive models, wherein at least one weighted random selection parameter is determined based on the model selection probability distribution;
        applying one or more predictive operations of the respective selected predictive model to the predictive input to generate one or more model-specific predictive scores for the predictive input; and
        determining the cross-model predictive score for the predictive input by transforming the one or more model-specific predictive scores associated with the predictive input using respective cross-model normalization parameters of the cross-model normalization data for the selected predictive model associated with the predictive input;
    determine, based on a predictive ranking of predictive inputs of the plurality of predictive inputs ranked according to respective cross-model predictive scores for the predictive inputs, one or more optimal predictive models of the plurality of predictive models;
    apply the one or more optimal predictive models to one or more predictive inputs of the predictive ranking of predictive inputs to generate cross-model predictive output;
    generate, based on the cross-model predictive output associated with the one or more optimal predictive models, an electronic communication for a promotional outreach related to a merchant of goods or services; and
    transmit the electronic communication to a computing device to render data associated with the electronic communication via a graphical interface of the computing device.

2. The apparatus of claim 1, wherein the weighted random selection for a predictive input of the plurality of predictive inputs is characterized by one or more weighted random selection parameters for the predictive input.

3. The apparatus of claim 1, wherein the at least one non-transitory memory and the program code are configured to, with the at least one processor, cause the apparatus to:
    identify, from the plurality of predictive models, a champion predictive model and one or more challenger predictive models.

4. The apparatus of claim 3, wherein the at least one non-transitory memory and the program code are configured to, with the at least one processor, cause the apparatus to:
    determine, for each predictive input of the plurality of predictive inputs, an initial ranking predictive score by applying the champion predictive model to the predictive input,
    wherein each cross-model predictive score is determined in a predictive score generation order, and
    wherein the predictive score generation order is determined based on each initial ranking predictive score associated with a predictive input of the plurality of predictive inputs.

5. The apparatus of claim 3, wherein the champion predictive model comprises a respective selection probability score that is higher than the respective selection probability score for each challenger predictive model of the one or more challenger predictive models.

6. The apparatus of claim 3, wherein the at least one non-transitory memory and the program code are configured to, with the at least one processor, cause the apparatus to:
    identify, for each predictive model of the plurality of predictive models, a retrospective predictive success score, wherein the retrospective predictive success score for each predictive model defines a retrospective prediction-outcome correspondence for the predictive model between one or more retrospective predictive scores generated by the predictive model and one or more retrospective ground-truth predictive outcomes corresponding to the one or more past predictive scores; and
    determine the champion predictive model based on each retrospective predictive success score associated with a predictive model of the plurality of predictive models.

7. The apparatus of claim 3, wherein the at least one non-transitory memory and the program code are configured to, with the at least one processor, cause the apparatus to:
    simultaneously generate a score for the champion predictive model and respective scores for the one or more challenger predictive models; and compare the respective scores for the one or more challenger predictive models to the score for the champion predictive model.

8. The apparatus of claim 7, wherein the at least one non-transitory memory and the program code are configured to, with the at least one processor, cause the apparatus to:
evaluate the score for the champion predictive model and the respective scores for the one or more challenger predictive models based on two or more objective functions; and
select the champion predictive model or the one or more challenger predictive models based on an evaluation of the score for the champion predictive model and the respective scores for the one or more challenger predictive models.

9. A computer-implemented method for performing a cross-model predictive inference to generate a cross-model predictive output for a plurality of predictive inputs related to candidate merchants of goods or services using a plurality of predictive models, the computer-implemented method comprising:
obtaining a model selection probability distribution, wherein the model selection probability distribution defines, for each predictive model of a plurality of predictive models, a respective selection probability score;
obtaining, for each predictive model of the plurality of predictive models, respective cross-model normalization data;
determining a cross-model predictive score for each predictive input of the plurality of predictive inputs, wherein determining the cross-model predictive score for the predictive input comprises:
determining, based on a weighted random selection for the predictive input, a respective selected predictive model of the plurality of predictive models, wherein at least one weighted random selection parameter is determined based on the model selection probability distribution;
applying one or more predictive operations of the respective selected predictive model to the predictive input to generate one or more model-specific predictive scores for the predictive input; and
determining the cross-model predictive score for the predictive input by transforming the one or more model-specific predictive scores associated with the predictive input using respective cross-model normalization parameters of the cross-model normalization data for the selected predictive model associated with the predictive input;
determining, based on a predictive ranking of predictive inputs of the plurality of predictive inputs ranked according to respective cross-model predictive scores for the predictive inputs, one or more optimal predictive models of the plurality of predictive models;
applying the one or more optimal predictive models to one or more predictive inputs of the predictive ranking of predictive inputs to generate cross-model predictive output;
generating, based on the cross-model predictive output associated with the one or more optimal predictive models, an electronic communication for a promotional outreach related to a merchant of goods or services; and
transmitting the electronic communication to a computing device to render data associated with the electronic communication via a graphical interface of the computing device.

10. The computer-implemented method of claim 9, further comprising:
identifying, from the plurality of predictive models, a champion predictive model and one or more challenger predictive models.

11. The computer-implemented method of claim 9, further comprising, for each predictive input of the plurality of predictive inputs:
identifying one or more unselected predictive models for the predictive input, wherein the one or more unselected predictive models for the predictive input comprise each predictive model in the plurality of predictive models other than the selected predictive model for the predictive input;
determining, for each unselected predictive model of the one or more unselected predictive models, a verification predictive score by applying the unselected predictive model to the predictive input;
obtaining, subsequent to expiration of a threshold prospective performance time interval after determining the cross-model predictive output, a prospective ground-truth success outcome for the predictive input corresponding to the threshold prospective performance time interval; and
determining a prospective predictive success score for each predictive model of the plurality of predictive models, wherein the prospective predictive success score for the selected predictive model is determined based on a recent ground-truth success outcome for the predictive input and the cross-model predictive score for the predictive input, and wherein each prospective predictive success score for an unselected predictive model of the one or more unselected predictive model is determined based on the recent ground-truth success outcome for the predictive input and the verification predictive score associated with the unselected predictive model.

12. The computer-implemented method of claim 11, further comprising:
adjusting the selection probability score for each predictive model of the plurality of predictive models based on the prospective predictive success score for the predictive model.

13. The computer-implemented method of claim 9, wherein:
each cross-model normalization data for a predictive model of the plurality of predictive models defines one or more cross-model conversion operations for the predictive model;
the one or more cross-model conversion operations for a respective predictive model are configured to convert the cross-model predictive output for the respective predictive model each having an output-specific range to a cross-model value having a cross-model range; and
each cross-model predictive score for a predictive model of the plurality of predictive models is determined based on a respective cross-model value for the predictive model.

14. The computer-implemented method of claim 9, wherein:
each predictive input of the plurality of predictive inputs is associated with a candidate merchant identifier of a plurality of candidate merchant identifiers;
each candidate merchant identifier of the plurality of candidate merchant identifiers is associated with a candidate merchant data structure of a plurality of candidate merchant data structures;

each predictive input associated with a candidate merchant identifier comprises the candidate merchant data structure associated with the candidate merchant identifier;

each cross-model predictive score for a predictive input of the plurality of predictive inputs indicates a merchant promotional outreach interest prediction for the candidate merchant identifier associated with the predictive input; and the cross-model predictive output indicates a threshold number of merchant identifiers of the plurality of candidate merchant identifiers whose corresponding merchant promotional outreach interest prediction exceeds is highest among each merchant promotional outreach interest prediction associated with a candidate merchant identifier of the plurality of candidate merchant identifiers.

15. The computer-implemented method of claim 9, wherein determining the selected predictive model for a respective predictive input comprises:

determining, based on the weighted random selection, a first randomly-selected predictive model for the predictive input.

16. The computer-implemented method of claim 15, further comprising:

identifying the cross-model predictive score for the predictive input generated by the first randomly-selected predictive model;

determining a first candidate cross-model predictive score by applying the first randomly-selected predictive model to the predictive input to generate one or more first candidate model-specific predictive scores and transforming the one or more first candidate model-specific predictive scores to the first candidate cross-model predictive score based on the cross-model normalization data for the first randomly-selected predictive model;

determining whether the first candidate cross-model predictive score for the predictive input satisfies cross-model score adoption data for the plurality of predictive models; and in response to determining that the first candidate cross-model predictive score for the predictive input satisfies the cross-model score adoption data for the plurality of predictive models, adopting the first candidate cross-model predictive score as the cross-model predictive score for the predictive input.

17. The computer-implemented method of claim 16, further comprising, in response to determining that the first candidate cross-model predictive score for the predictive input fails to satisfy the cross-model score adoption data for the plurality of predictive models:

identifying a champion predictive model of the plurality of predictive models;

determining a second candidate cross-model predictive score by applying the champion predictive model to the predictive input to generate one or more second candidate model-specific predictive scores and transforming the one or more second candidate model-specific predictive scores to the second candidate cross-model predictive score based on the cross-model normalization data for the champion predictive model;

determining whether the second candidate cross-model predictive score for the predictive input satisfies cross-model score adoption data for the plurality of predictive models; and in response to determining that the second candidate cross-model predictive score for the predictive input satisfies the cross-model score adoption data for the plurality of predictive models, adopting the second candidate cross-model predictive score as the cross-model predictive score for the predictive input.

18. The computer-implemented method of claim 17, further comprising, in response to determining that the first candidate cross-model predictive score fails to satisfy the cross-model score adoption data for the plurality of predictive models:

performing a second weighted random selection for the predictive input to determine a second randomly-selected predictive model of the plurality of predictive models; determining a second candidate cross-model predictive score by applying the second randomly-selected predictive model to the predictive input to generate one or more second candidate model-specific predictive scores and transforming the one or more second candidate model-specific predictive scores to the second candidate cross-model predictive score based on the cross-model normalization data for the second randomly-selected predictive model;

determining whether the second candidate cross-model predictive score for the predictive input satisfies cross-model score adoption data for the plurality of predictive models; and in response to determining that the second candidate cross-model predictive score for the predictive input satisfies the cross-model score adoption data for the plurality of predictive models, adopting the second candidate cross-model predictive score as the cross-model predictive score for the predictive input.

19. The computer-implemented method of claim 17, further comprising, in response to determining that the first candidate cross-model predictive score for the predictive input fails to satisfy the cross-model score adoption data for the plurality of predictive models, modifying the plurality of predictive inputs to eliminate the predictive input.

20. The computer-implemented method of claim 9, wherein the weighted random selection for a predictive input of the plurality of predictive inputs is characterized by one or more weighted random selection parameters for the predictive input.

21. A non-transitory computer storage medium comprising instructions configured to cause one or more processors to at least perform a method for performing a cross-model predictive inference to generate a cross-model predictive output for a plurality of predictive inputs related to candidate merchants of goods or services using a plurality of predictive models, the method comprising:

obtain a model selection probability distribution, wherein the model selection probability distribution defines, for each predictive model of the plurality of predictive models, a respective selection probability score;

obtain, for each predictive model of the plurality of predictive models, respective cross-model normalization data;

determine a cross-model predictive score for each predictive input of the plurality of predictive inputs, wherein determining the cross-model predictive score for the predictive input comprises:

determining, based on a weighted random selection for the predictive input, a respective selected predictive model of the plurality of predictive models, wherein at least one weighted random selection parameter is determined based on the model selection probability distribution;

applying one or more predictive operations of the respective selected predictive model to the predictive input to generate one or more model-specific predictive scores for the predictive input; and determining the cross-model predictive score for the predictive input by transforming the one or more model-specific predictive scores associated with the predictive input using respective cross-model normalization parameters of the cross-model normalization data for the selected predictive model associated with the predictive input;

determine, based on a predictive ranking of predictive inputs of the plurality of predictive inputs ranked according to respective cross-model predictive scores for the predictive inputs, one or more optimal predictive models of the plurality of predictive models;

apply the one or more optimal predictive models to one or more predictive inputs of the predictive ranking of predictive inputs to generate the cross-model predictive output;

generate, based on the cross-model predictive output associated with the one or more optimal predictive models, an electronic communication for a promotional outreach related to a merchant of goods or services; and transmit the electronic communication to a computing device to render data associated with the electronic communication via a graphical interface of the computing device.

22. The non-transitory computer storage medium of claim 21, wherein the weighted random selection for a predictive input of the plurality of predictive inputs is characterized by one or more weighted random selection parameters for the predictive input.

* * * * *